US012291913B2

(12) United States Patent
Wilson

(10) Patent No.: US 12,291,913 B2
(45) Date of Patent: May 6, 2025

(54) HINGES OR THE LIKE

(71) Applicant: D & D Technologies Pty Ltd, Frenchs Forest (AU)

(72) Inventor: Tom Wilson, Manly (AU)

(73) Assignee: D & D Technologies Pty Ltd, Frenchs Forest (AU)

( * ) Notice: Subject to any disclaimer, the term of this patent is extended or adjusted under 35 U.S.C. 154(b) by 0 days.

(21) Appl. No.: 17/926,263

(22) PCT Filed: May 19, 2021

(86) PCT No.: PCT/AU2021/050470
§ 371 (c)(1),
(2) Date: Nov. 18, 2022

(87) PCT Pub. No.: WO2021/232100
PCT Pub. Date: Nov. 25, 2021

(65) Prior Publication Data

US 2023/0203864 A1 Jun. 29, 2023

(30) Foreign Application Priority Data

May 20, 2020 (AU) ................................ 2020901623

(51) Int. Cl.
*E05D 7/04* (2006.01)
*E05D 7/00* (2006.01)

(52) U.S. Cl.
CPC ........ *E05D 7/0009* (2013.01); *E05Y 2600/12* (2013.01); *E05Y 2600/14* (2013.01);
(Continued)

(58) Field of Classification Search
CPC ....... E05D 7/04; E05D 7/0423; E05D 7/0415; E05D 7/043; E05D 7/0009; E05D 7/0027;
(Continued)

(56) References Cited

U.S. PATENT DOCUMENTS 2,583,950 A * 1/1952 Kirschner ............. E05D 7/0423 16/238
2,615,194 A * 10/1952 Kreiner ..................... E05D 7/04 16/248
(Continued)

FOREIGN PATENT DOCUMENTS

CH 637725 A5 * 8/1983
DE 3813004 A1 11/1989
(Continued)

OTHER PUBLICATIONS

International Search Report and Written Opinion for Related Application No. PCT/AU2021/050470 dated Jul. 21, 2021 (10 pages).

*Primary Examiner* — Chuck Y Mah
(74) *Attorney, Agent, or Firm* — Michael Best & Friedrich LLP

(57) ABSTRACT

A hinge assembly comprising a first hinge leaf assembly and a second hinge leaf assembly, each having their respective hinge leaf. The hinge assembly further comprises at least one mounting member fixable to a moveable barrier through a fixing arrangement. The first and/or second hinge leaf is connectable to the at least one mounting member so as to be adjustable relative thereto. A locking arrangement is also included to releasably lock the first and/or second hinge leaf to the at least one mounting member. The locking arrangement is operative to adopt a hold condition where relative movement between the first and/or second hinge leaf and the at least one mounting member is prevented, and a released condition where the first and/or second hinge leaf is able to be adjusted relative to the at least one mounting member.

21 Claims, 17 Drawing Sheets

(52) U.S. Cl.
CPC ... *E05Y 2600/312* (2013.01); *E05Y 2600/314* (2013.01); *E05Y 2900/132* (2013.01); *E05Y 2900/40* (2013.01)

(58) Field of Classification Search
CPC .... E05D 2007/0438; E05D 2007/0446; E05D 2007/0453; E05D 2007/0461; E05D 2007/0476; E05D 2007/0484; E05D 2007/0492; E05Y 2600/12; E05Y 2600/14; E05Y 2600/312; E05Y 2600/314; E05Y 2900/20; E05Y 2900/132; E05Y 2900/40; E05Y 16/86; E05Y 16/01; E05Y 16/236–238; E05Y 16/245–246
See application file for complete search history.

(56) References Cited

U.S. PATENT DOCUMENTS

| | | | | | |
|---|---|---|---|---|---|
| 2,839,778 | A * | 6/1958 | Hutchinson | E05D 7/0423 16/245 |
| 2,885,722 | A * | 5/1959 | Halliday | E05D 7/12 16/237 |
| 4,185,357 | A * | 1/1980 | Busse | E05D 5/08 16/265 |
| 4,407,044 | A * | 10/1983 | Iseki | E05D 11/1014 16/237 |
| 4,653,144 | A * | 3/1987 | Lautenschlager, Jr. | E05D 7/0407 16/249 |
| 6,286,185 | B1 * | 9/2001 | Ramsauer | E05D 7/04 16/236 |
| 8,966,713 | B1 * | 3/2015 | Russo | E05D 7/00 16/285 |
| 11,111,709 | B1 * | 9/2021 | Santa | E05D 7/0009 |
| 2014/0259527 | A1 * | 9/2014 | Chung | E05D 7/0415 16/238 |
| 2017/0335613 | A1 * | 11/2017 | Stuart | E05D 3/022 |

FOREIGN PATENT DOCUMENTS

| | | | | |
|---|---|---|---|---|
| DE | 202011101342 | U1 * | 10/2012 | E05D 5/0246 |
| EP | 1348826 | A2 | 10/2003 | |
| EP | 2949844 | A1 | 12/2015 | |
| EP | 3604723 | A1 * | 2/2020 | E05D 5/0223 |
| JP | 2013522504 | A * | 6/2013 | |
| JP | 2014118785 | A * | 6/2014 | |

* cited by examiner

HINGES OR THE LIKE

TECHNICAL FIELD

The present invention relates to a hinge assembly mountable to a structure.

BACKGROUND ART

Various forms of hinges have been previously proposed such as U.S. Pat. No. 5,584,100 (Doyle et al) and US Patent Publication No. 2014/0075720A1 (Caffin et al.). U.S. Pat. No. 5,584,100 (Doyle et al) discloses a self-closing hinge assembly where a torsional spring is provided inside a cylindrical housing to connect the one hinge leaf to another via a coupling element located at each end of the cylindrical housing, so that the torsional spring may provide a closing force. As disclosed in U.S. Pat. No. 5,584,100 (Doyle et al), one of the coupling elements is adjustable around the axis of the torsional spring to vary the spring rate and thus changing the closing force of the spring.

US Patent Publication No. 2014/0075720A1 (Caffin et al.) discloses a self-closing hinge assembly where both coupling portions on each end are adjustable around the axis of the torsional spring, so that the closing force of the spring can be easily adjusted.

It is to be understood that, if any prior art is referred to herein, such reference does not constitute an admission that the prior art forms a part of the common general knowledge in the art, in Australia or any other country.

SUMMARY

According to a first aspect, disclosed is a hinge assembly comprising:

a first hinge leaf assembly and a second hinge leaf assembly, each having their respective hinge leaf, wherein the first hinge leaf assembly being connectable to the second hinge leaf assembly and when so connected the first hinge leaf assembly being rotatable relative to the second hinge leaf assembly about an axis;

at least one mounting member fixable to a moveable barrier or a structure through a fixing arrangement, the first and/or second hinge leaf being connectable to the at least one mounting member so as to be adjustable relative thereto in a least one direction; and a locking arrangement to releasably lock the first and/or second hinge leaf to the at least one mounting member, the locking arrangement being operative to adopt a hold condition where relative movement between the first and/or second hinge leaf and the at least one mounting member is prevented, and a released condition where the first and/or second hinge leaf is able to be adjusted relative to the at least one mounting member, the locking arrangement comprises a locking element disposed between the first and/or second hinge leaf and the at least one mounting member, and movable relative to both the first and/or second hinge leaf and the at least one mounting member to cause the locking arrangement to adopt the hold condition or the released condition.

Advantageously, the hinge assembly facilitates adjustments once the hinge assembly is installed on a structure, which may simplify the installation of hinge assemblies, whilst improving the functionality of the hinge assemblies. For example, the first and/or second hinge leaf is adjustable relative to the at least one mounting member to ensure correct alignment and position of the components of the hinge assembly.

In some embodiments, the locking arrangement further comprises a drive member operative to move the locking element to cause the locking arrangement to adopt the hold condition or the released condition.

In some embodiments, the at least one mounting member and the first and/or second hinge leaf are interconnected via a guide arrangement, wherein the guide arrangement includes one or more rails provided on at least one mounting member or the first and/or second hinge leaf, and one or more complementary tracks provided in the other of the at least one mounting member or the first and/or second hinge leaf.

In some embodiments, when in the released condition the guide arrangement prevents the hinge leaf from fully separating from the mounting member in the direction parallel to the mounting member being mounted to the moveable barrier or structure.

In some embodiments, the movement of the locking element between the hold and released conditions is perpendicular or transverse to a pivotal axis of the hinge leaf assembly.

According to a second aspect, disclosed is a hinge leaf assembly mountable to a movable barrier or structure comprising:

a hinge leaf and at least one mounting member, wherein the hinge leaf and the at least one mounting member are connected by a guide arrangement to allow the hinge leaf to move relative to the at least one mounting member, whereby a locking element is provided in either the hinge leaf or the at least one mounting member that is operable to adapt a hold condition and a released condition, and when the locking element is in the hold condition relative movement between the hinge leaf and the at least one mounting member is prevented, and when the locking element is in the released condition the hinge leaf is able to move relative to the at least one mounting member.

In some embodiments, the locking arrangement is able to adopt the hold condition when the first and/or second hinge leaf and the at least one mounting member are in more than one position to allow, when the locking arrangement is in the released condition, repositioning of the first and/or second hinge leaf assembly relative to the at least one mounting member to a selected position whereat the locking arrangement is moved to the hold condition.

In some embodiments, a drive member is used to move the locking element between the hold and released conditions.

According to a third aspect, disclosed is a hinge assembly comprising one or more hinge leaf assemblies.

In some embodiments, when the locking element of the first hinge leaf assembly is in the released condition the leaf moves with respect to the mounting member in a direction parallel to a pivotal axis of the hinge assembly, and when the locking element of the second hinge leaf assembly is in the released conditions the leaf moves with respect to the mounting member in a direction perpendicular or transverse to the pivotal axis of the hinge assembly.

BRIEF DESCRIPTION OF THE DRAWINGS

There now follows, by way of example only, a detailed description of embodiments of the present disclosure, with reference to the Figures identified below.

DETAILED DESCRIPTION OF THE EMBODIMENTS

Figure 1:
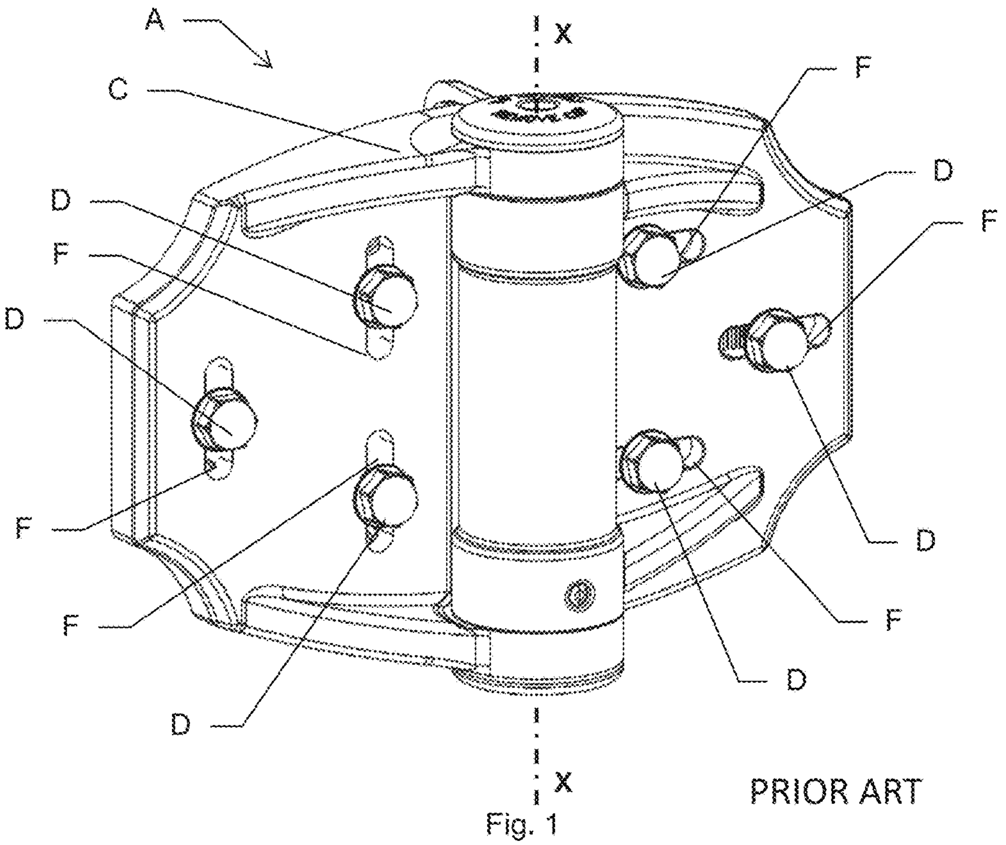
FIG. 1 is a front perspective view of a prior art hinge assembly.

In the following description, functionally similar parts carry the same reference numerals between different embodiments. The drawings are intended to be schematic, and dimensions, scale and/or angles may not be determined accurately from them unless otherwise stated.

It is understood that, unless otherwise stated, the upward and downward directions refer to the orientation of a latch when mounted onto a substantially vertical surface.

It is understood that, unless otherwise stated, the left and right directions refer to the orientation of a latch when mounted onto a substantially vertical surface.

It is understood that, unless otherwise stated, the linear direction means an object, assembly or subassembly can move from one position to another in a substantially direct motion along any plane, but not limited to the horizontal, vertical or angular planes.

It is understood that, unless otherwise stated, the structure may include a moveable barrier, a gate, a fence, a panel, a post or any other suitable structure for mounting a latch assembly.

It is understood that, unless otherwise stated, the terms bracket, and fixture are intended to have their plain meaning.

It is understood, unless otherwise stated, the term rotation is not limited by its direction and may cover one or a combination of clockwise or counter-clockwise direction.

It is understood that, unless otherwise stated, the term mount includes temporarily secured, attached, removably fixed and secured, whereby the term is intended to describe one component placed onto another component or body and not limited to the type of fixture used or if the fixture is permanent or temporary.

It is understood that, unless otherwise stated, the term movable barrier includes, for example, a structure, hatch, gate, door, skylight or window, i.e. a member suitable for closing or opening an aperture, but not limited to the pivotal or direction of movement. For example, the member may pivot or slides horizontally and/or vertically.

It is understood that, unless otherwise stated, the terms aligned and/or alignment are not limited to concentric alignment, horizontal alignment, vertical alignment and planar alignment etc.

It is understood that, unless otherwise stated, the term guiding means or guide arrangement is not limited to tracks, rails, guides or slots etc., but also includes any means to limit movement between two or more interfacing objects, components or assemblies.

Figure 2:
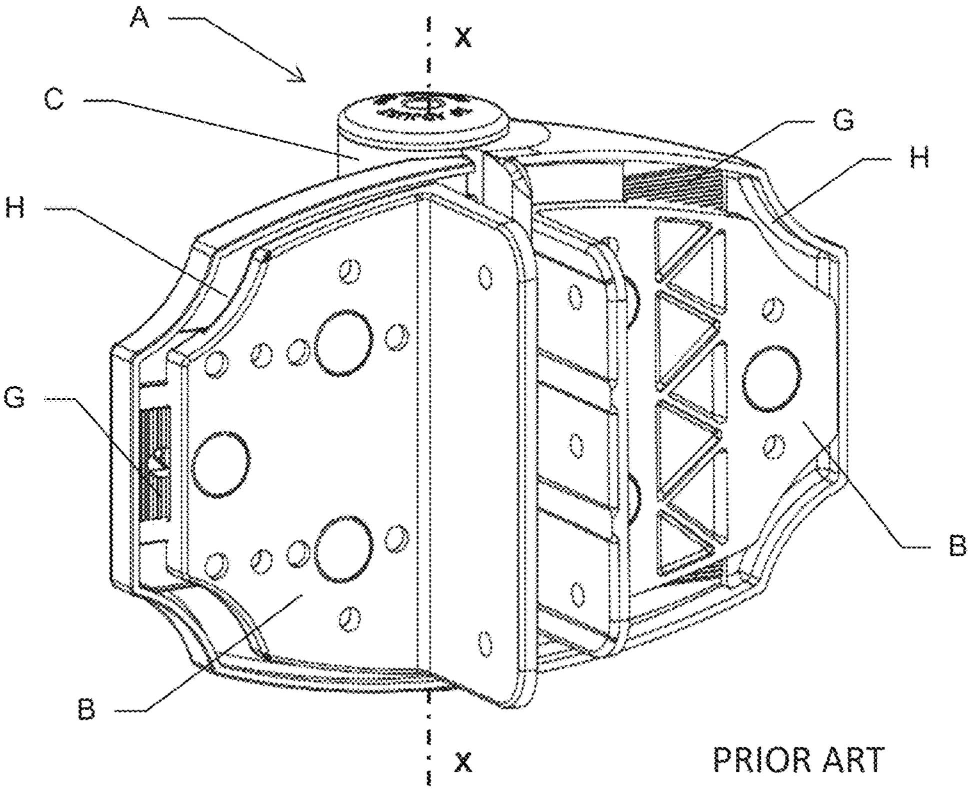
FIG. 2 is a rear perspective view of the prior art hinge assembly of FIG. 1.
Figure 3:
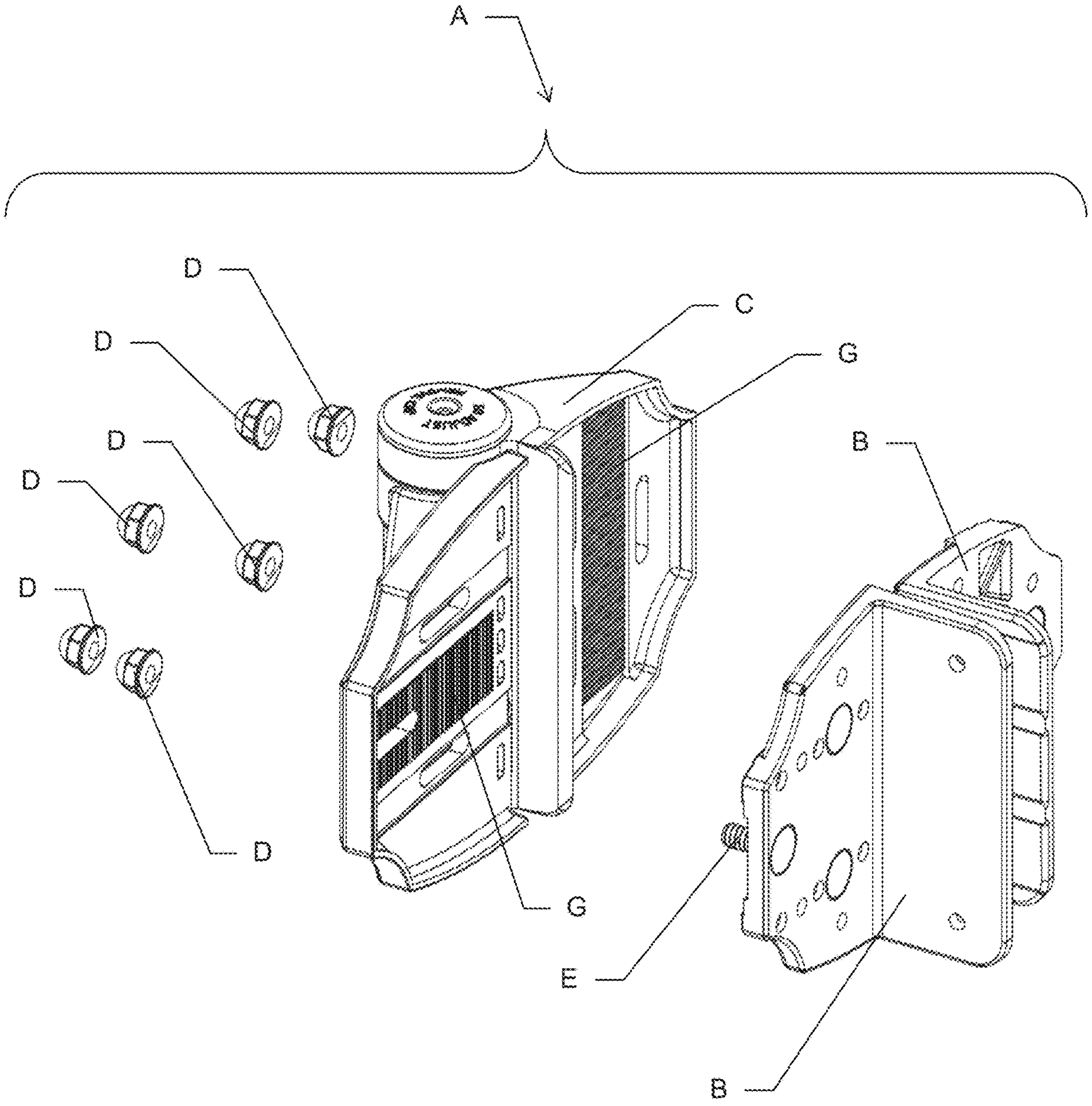
Fig. 3 PRIOR ART
FIG. 3 is an exploded view of the prior art hinge assembly of FIGS. 1 and 2.

FIGS. 1 and 2 are front and rear perspective views of a prior art self-closing hinge assembly A. FIG. 3 is an exploded perspective view of the prior art hinge assembly of FIGS. 1 and 2. As shown in FIGS. 1 and 2, line X-X indicates the pivotal axis of the prior art self-closing hinge assembly A.

Referring to FIGS. 1 to 3, the prior art self-closing hinge assembly A comprises two mounting brackets B secured to the hinge C via a series of nuts D engaging their respective threads E provided on the mounting brackets B. This arrangement allows the mounting bracket B to be secured to the hinge C. In order for the user to secure the hinge assembly A to a structure or gate, it requires the user to disassemble the hinge assembly A to allow the mounting brackets B to be first mounted to the structure or gate. Once the mounting brackets are secured in place, the hinge C is presented to the mounting brackets to allow the threads E to pass through their respective slots F in the hinge C so the nuts can engage with the threads E and secures the hinge C to the mounting bracket B.

The prior art self-closing hinge is provided with a series of ribs G provided on the mounting brackets B and hinge C to allow positive engagement therebetween. As shown in FIG. 2, when assembled the mounting brackets B resides in their respective cavities H provided in the hinge B. As illustrated in FIG. 2, there are clearances between the mounting brackets B and their respective cavities H, which in combination with the slots F allows horizontal and/or vertical adjustments between the hinge C and the mounting brackets B.

As described above, the prior art hinge has the following disadvantages:

i. In order to mount the hinge assembly A to the structure or gate, the user is required to disassemble the hinge assembly to allow the mounting brackets B to be first secured to the structure or gate. This increases the installation time and makes the installation cumbersome, but also increases the chance of losing the nuts D during the installation process.

ii. If the user wishes to make minor horizontal and/or vertical adjustments, this requires the user to loosen the nuts D so that the ribs G of the hinge C are disengaged with the ribs G of the mounting bracket B, so that the hinge A can be adjusted in relation to the mounting brackets B. Once adjusted correctly, the user would then tighten the nuts D. Since, there are multiple nuts D used in the hinge assembly A, this makes the adjustment process cumbersome and there is a possibility of losing the nuts D.

It can be envisaged the prior art hinge assembly A lacks security or tamper resistance as the hinge assembly A can be easily removed by unfastening the nuts D, as they are easily assessable from the front.

The present disclosure is directed to providing a hinge assembly to alleviate the installation and adjustment issues of the prior art hinge assembly.

Figure 4:
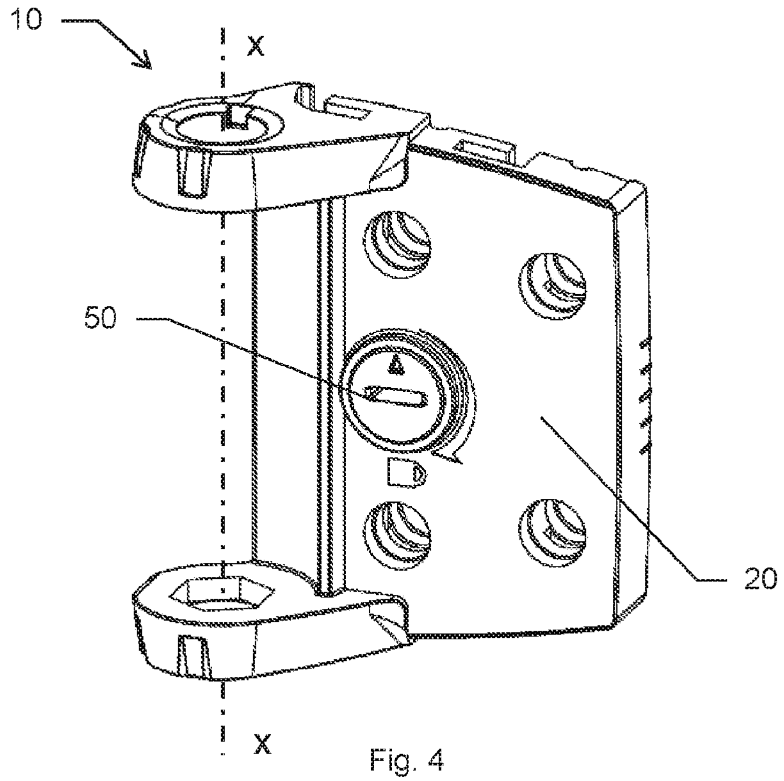
FIG. 4 is a front perspective view of an embodiment of a hinge assembly.
Figure 5:
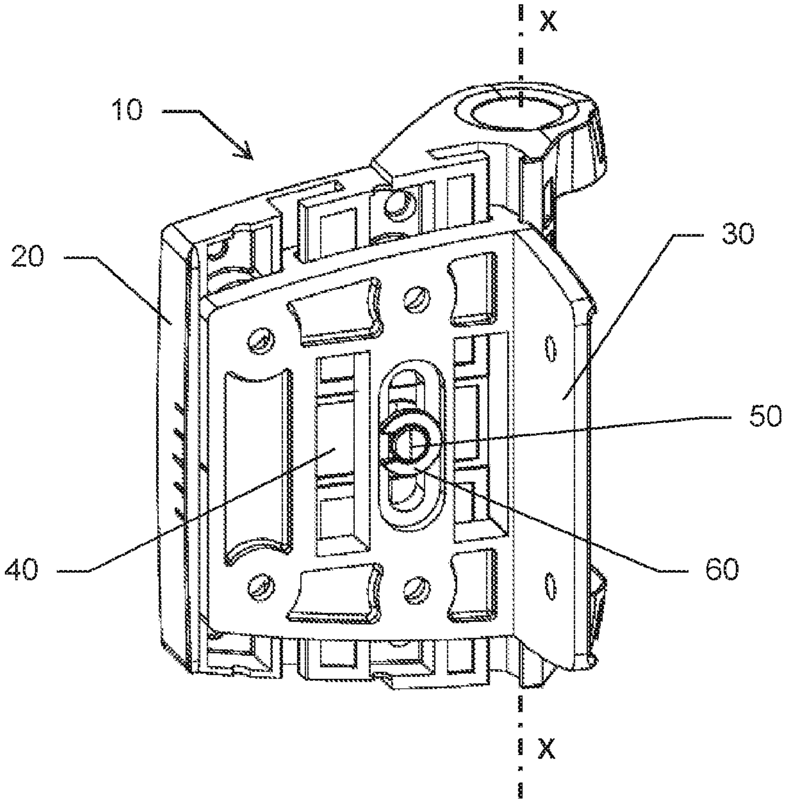
FIG. 5 is a rear perspective view of the hinge assembly of FIG. 4.
Figure 6:
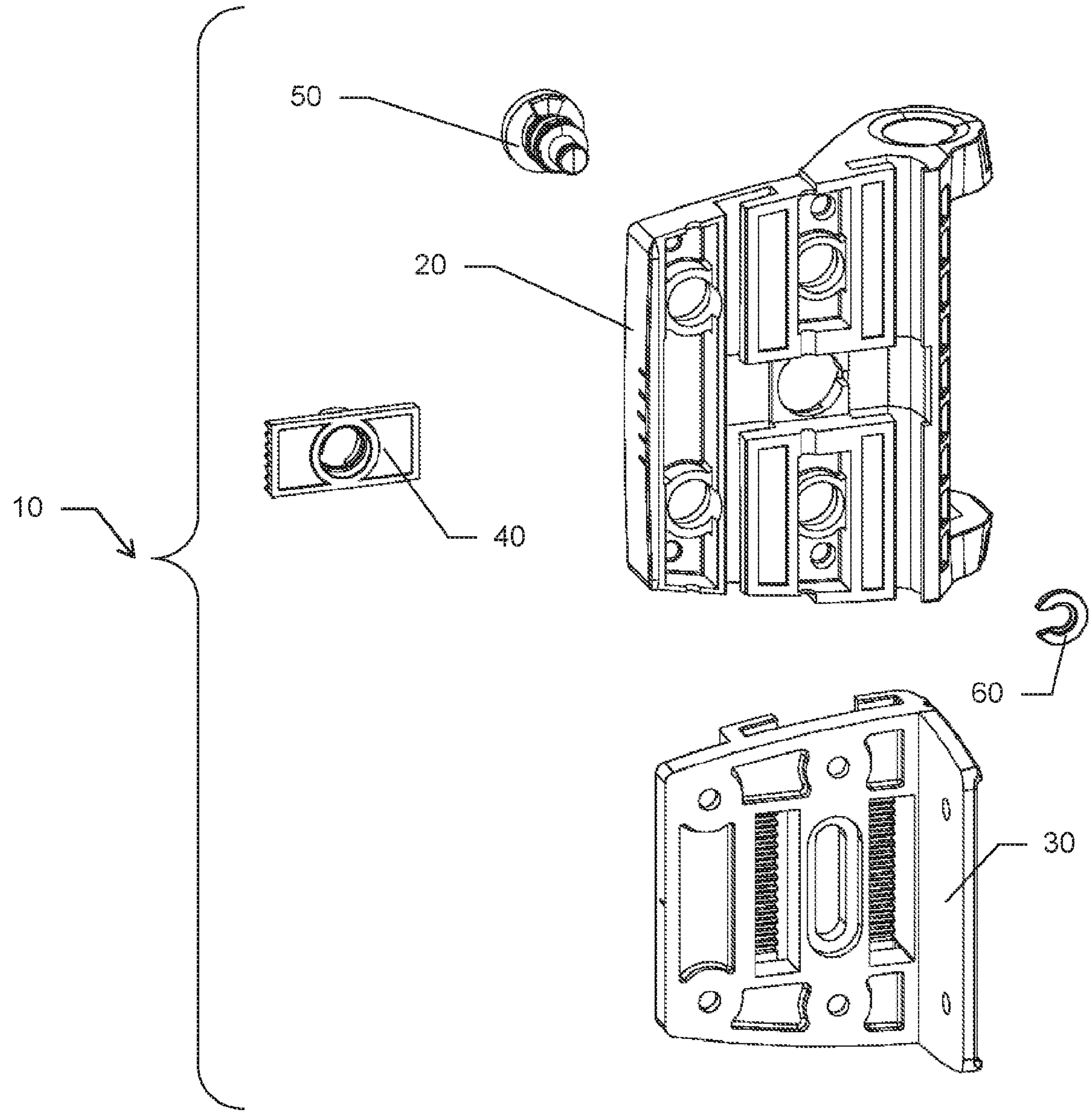
FIG. 6 is an exploded perspective view of the hinge assembly of FIG. 5.

FIGS. 4 and 5 are front and rear perspective views of a hinge leaf assembly 10 according to a first embodiment. FIG. 6 is an exploded perspective view of the hinge leaf assembly of FIG. 5. As shown in FIGS. 4 and 5, line X-X indicates the pivotal axis of the hinge leaf assembly 10.

Referring to FIGS. 4 to 6, the hinge leaf assembly 10 comprises a leaf 20, a mounting member 30, a locking element 40, a drive member 50 and a circlip 60. Details and function of each part of the hinge leaf assembly 10 shall be described in more detail below. For clarity purposes, the hinge leaf assembly 10 may contain known features disclosed in US Patent Publication No. 201410075720A1 (Caffin et al.), such as a coupling arrangement that connects the first and second hinge parts with a biasing member to restrain relative rotation of the hinge parts, where the coupling arrangement includes means to adjust the biasing force of the biasing member to allow hinge assembly to have a self-closing mechanism. Such features will not be further described herein.

Figure 7:
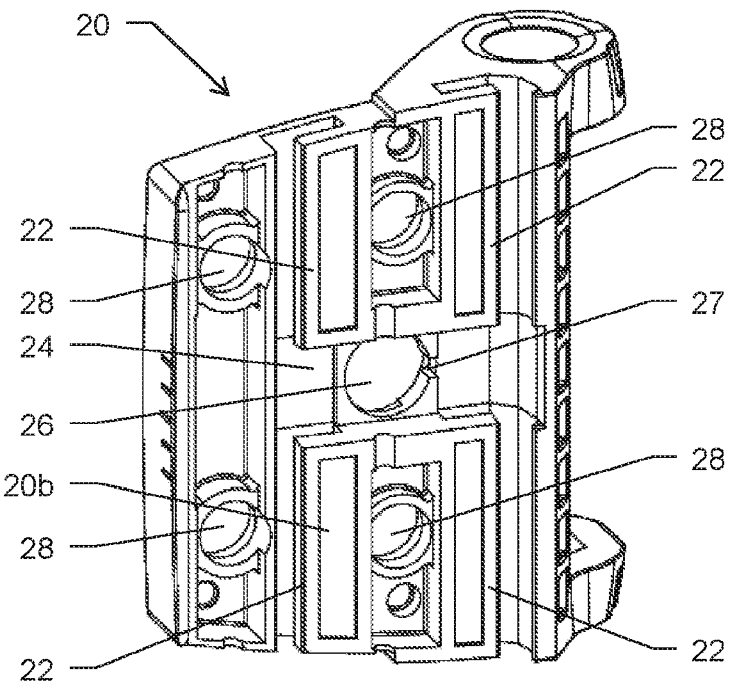
FIG. 7 is a rear perspective view of a hinge leaf.

FIG. 7 is a detailed rear perspective view of the leaf 20. The leaf 20 includes a front portion 20*a* and a rear portion 20*b*. The front portion 20*a* is arranged to be visible when mounted in the hinge assembly 100 and on the structure. The rear portion 20*b* is arranged to mate with the mounting member 30. In the illustrated embodiment, the rear portion 20*b* of the leaf 20 includes a pair of tracks 22, which form part of a guide arrangement, and a space 24 is defined therebetween. The tracks 22 are in the form of L-shaped slots which are complementary to another part of the guide arrangement. The tracks 22 are defined by an internal surface of the leaf 20. The tracks 22 allows the leaf 20 to receive the other part of the guide arrangement arranged on the mounting member 30. The space 24 allows the hinge leaf 20 to receive the locking element 40. The passage 26 is arranged proximal the space 24 and is defined for receiving the locking element 40 and the drive member 50. A wall of the leaf defining the passage 26 also defines a recess 27 for receiving a projection 48 provided on the locking element 40. When the recess 27 and the projection 48 are in engagement, the locking element 40 is unable to rotate relative to the leaf 20. Details on how the hinge leaf assembly 10 is assembled shall be described in more detail below.

Figure 8:
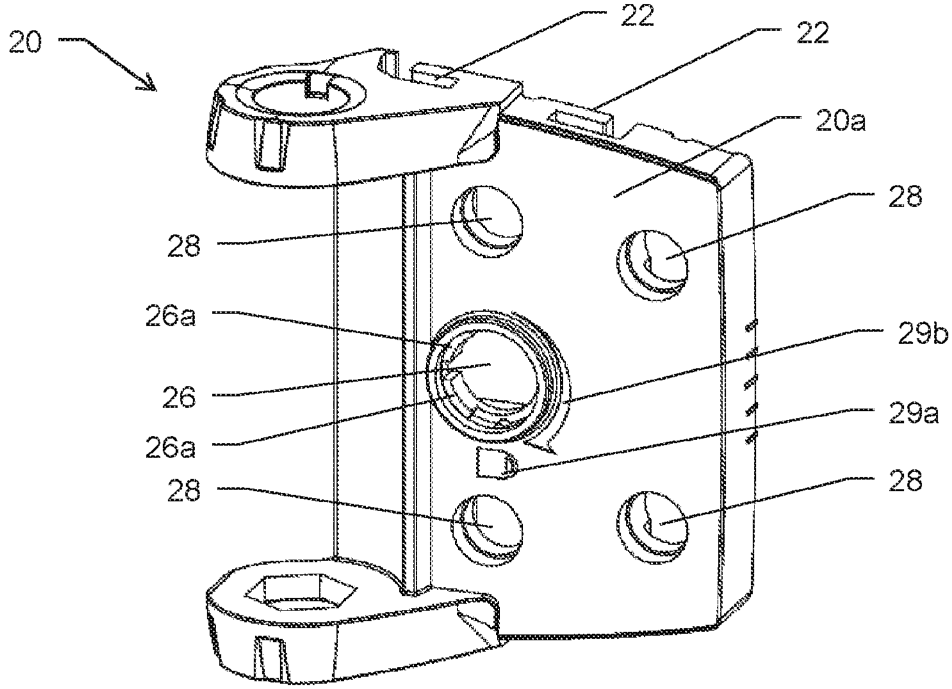
FIG. 8 is a front perspective view of the hinge leaf.

As shown in FIGS. 7 and 8, the leaf 20 is also provided with a series of apertures 28 to allow the user to access screws holes 38*a* in the mounting member 30. As shown in FIG. 8, indicator 29*a* shows the hold condition and indicator 29*b* shows the direction of rotation of the drive member 50. As shown, the indicator 29*a* indicative of the hold condition is illustrated with a padlock in the locked condition.

Figure 9:
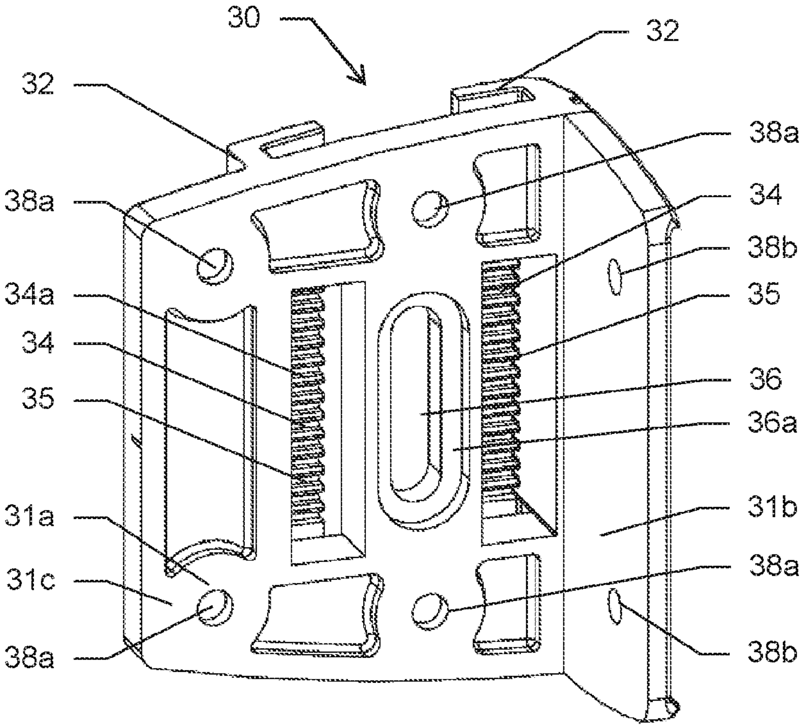
FIG. 9 is a rear perspective view of a mounting member.
Figure 10:
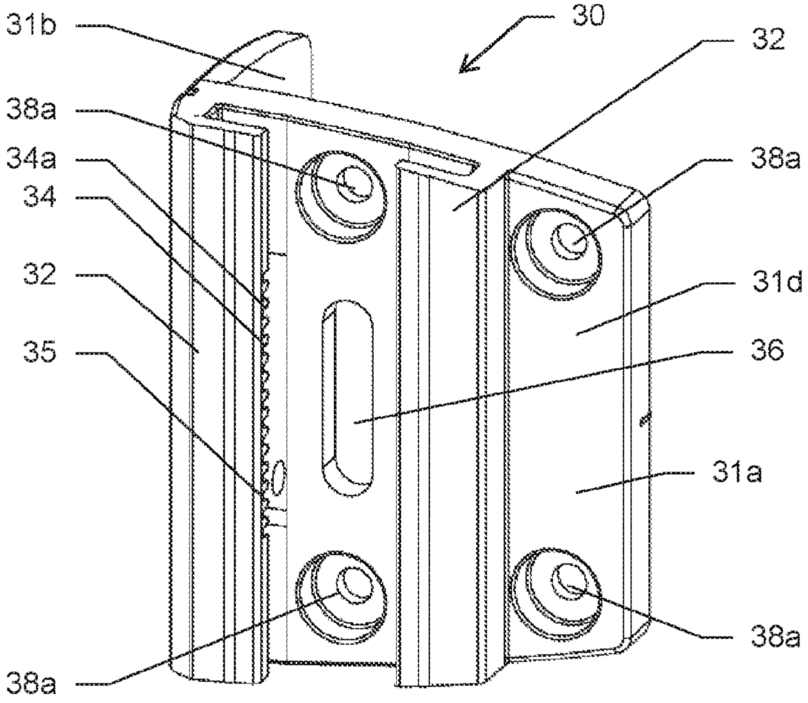
FIG. 10 is a front perspective view of the mounting member.

FIGS. 9 and 10 are detailed rear and front perspective views of the mounting member 30. In the illustrated embodiment of FIG. 20, the hinge assembly 100 includes two mounting members 30, one mountable to each hinge leaf 20. As shown in FIGS. 9 and 10, the mounting member 30 comprises a portion 31*a* and a flange 31*b* extending therefrom. The flange 31*b* is designed to abut against and be mounted to the side of the structure.

The first portion 31*a* includes a rear portion 31*c* and a front portion 31*d*. The rear portion 31*c* abuts against and mounted to the face of the structure. The front portion 31*d* is arranged to mate with the leaf 20. The mounting member 30 also includes a part of the guide arrangement. In the illustrated embodiment, the part of the guide arrangement is in the form of pair of rails 32 extending on the front portion 31*d* of the portion 31*a* for interengaging with the tracks 22 on the leaf 20. Each rail 32 is a complementary L-shape to each track 22. In the illustrated embodiment, the guide arrangement is operative to allow relative movement of the mounting member 30 and the leaf 20 along an axis, for example, along a longitudinal axis which allows movement up and down or a lateral axis which allows movement side to side. The guide arrangement also retains the mounting member 30 and the leaf 20 together. In this way, when mounted together the relative movement of the mounting member 30 and the leaf 20 is limited to movement along the direction of the rail 32 and track 22.

Located on a portion of each rail 32 is a profiled surface in the form of a plurality of alternating recesses 34 and ribs 34*a* that form a set of locking teeth 35. The teeth 35 engage a corresponding profiled surface of the locking element 40. Details on how the locking teeth 35 engage the locking element 40 shall be described in more detail below.

As shown in FIGS. 9 and 10, the mounting member 30 also includes a slot 36 with a flange 36*a* for receiving the drive member 50 and a circlip 60. The circlip 60 retains the drive member 50 to the mounting member 30 at the rear portion of the mounting member 30.

The mounting member 30 also includes the screw holes 38*a*, 38*b* which allow the user to secure the mounting member 30 to a structure. As shown, the screw holes 38*a* include a recess to allow a head of each screw (not shown) to substantially reside therein so it does not impede the insertion of the hinge leaf 20.

Figure 11:
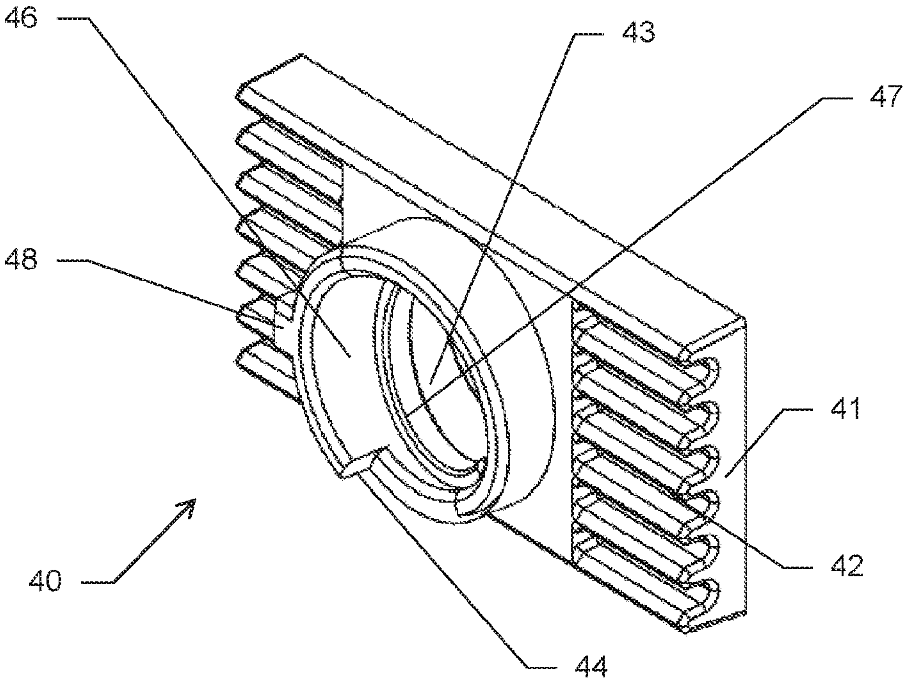
FIG. 11 is a perspective view of a locking element.

FIG. 11 is a perspective view of the locking element 40. As shown, the locking element 40 comprises a substrate 41 and a annular wall 46 extending from the substrate 41. The substrate 41 and annular wall 46 include a passage 43 therethrough for receiving the drive member 50. The substrate 41 also includes a profiled surface including a series of alternating recesses 34 and ribs 34*a* in the form locking teeth 42 on one face. The profiled surface of the locking element 40 is complementary to the profiled surface (e.g., the teeth 35) of the mounting member 30. The annular wall 46 includes an internal thread formed in an inner diameter/surface comprises for engaging with a corresponding thread 52 formed on the drive member 50.

A stop arrangement includes a stop 44 provided on the annular wall 46 to limit or prevent further rotation of the drive member 50, which will be described in more detail below. The projection 48 is provided on an external portion of the annular wall 46 to guide or control movement of the locking element 40 with the hinge leaf 20.

Figure 12:
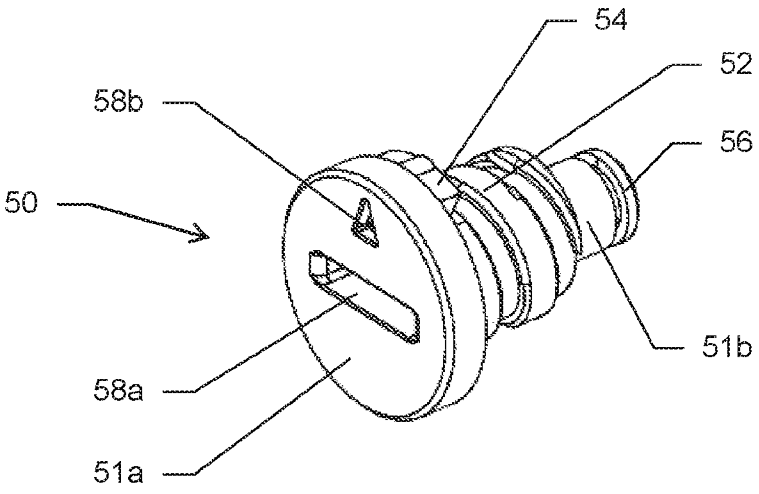
FIG. 12 is a perspective view of a drive member.

FIG. 12 is a perspective view of the drive member 50. As shown, the drive member 50 comprises a head 51*a* and a shank 51*b* extending therefrom. The thread 52 is formed around the shank 51*b*. The stop arrangement also includes a stop 54 provided on the drive member 50 that abuts the stop 44 of the locking element 40 to limit or prevent further rotation of the drive member 50. An annular groove 56 is provided on the drive member 50 for receiving a circlip 60, which will be described in more detail below.

A driving interface 58*a* is provided on the head 51*a* to allow an instrument to be inserted therein and rotate the drive member 50. As shown in FIG. 12, the driving interface 58*a* is illustrated by a slot for receiving a flat head screw-driver. Other driving interfaces may be used such a cross hair for a Phillips screwdriver or a hexagonal recess for an Allen key etc. An indicator 58*b* is also provided on the head 51*a* to show the position of the drive member 50 in relation to the hinge leaf assembly 10, which will be described in more detail below.

Figure 13:
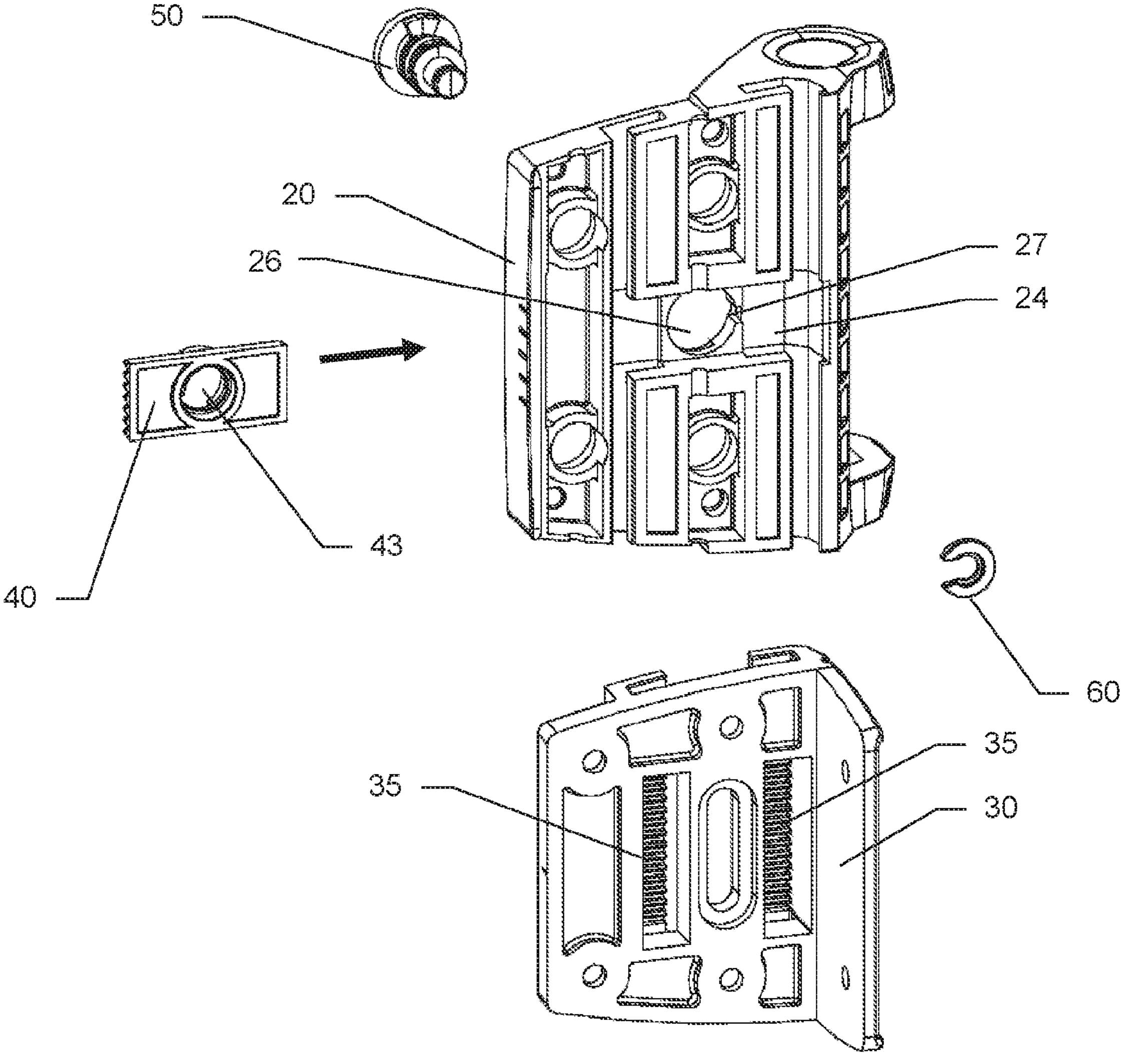
FIG. 13 is an exploded isometric view of the hinge assembly of FIG. 5 illustrating the first stage of assembly.

FIG. 13 is an exploded isometric view of the hinge leaf assembly 10 illustrating the first stage of assembly, where the locking element 40 is inserted into the space 24 provided on the leaf 20. As the locking element 40 is inserted into the space 24, the projection 48 of the locking element 40 resides in the recess 27, such that the locking element 40 can only be inserted and operate in a specific orientation. Moreover, the locking element can only be inserted and operate in a specific orientation, such that the thread 52 of the drive member 50 can be aligned correctly with the thread 47 of the locking element 40. This allows the drive member 50 to operate in the correct rotational envelope and direction as indicated by indicator 58*b* on the drive member 50 and indicators 29*a*, 29*b* on the hinge leaf 20. The space 24 is deeper than the locking element 40 to allow for the teeth of the locking element to be moved into and out of engagement with the teeth of the mounting member by the drive member. In addition, the projection 48 may allow the passage 43 to be aligned or concentric with the passage 26 of the hinge leaf 20. As shown in FIG. 13, the locking element 40 resides in the space 24 to limit the rotational movement between the hinge leaf 20 and the locking element 40.

Figure 14:
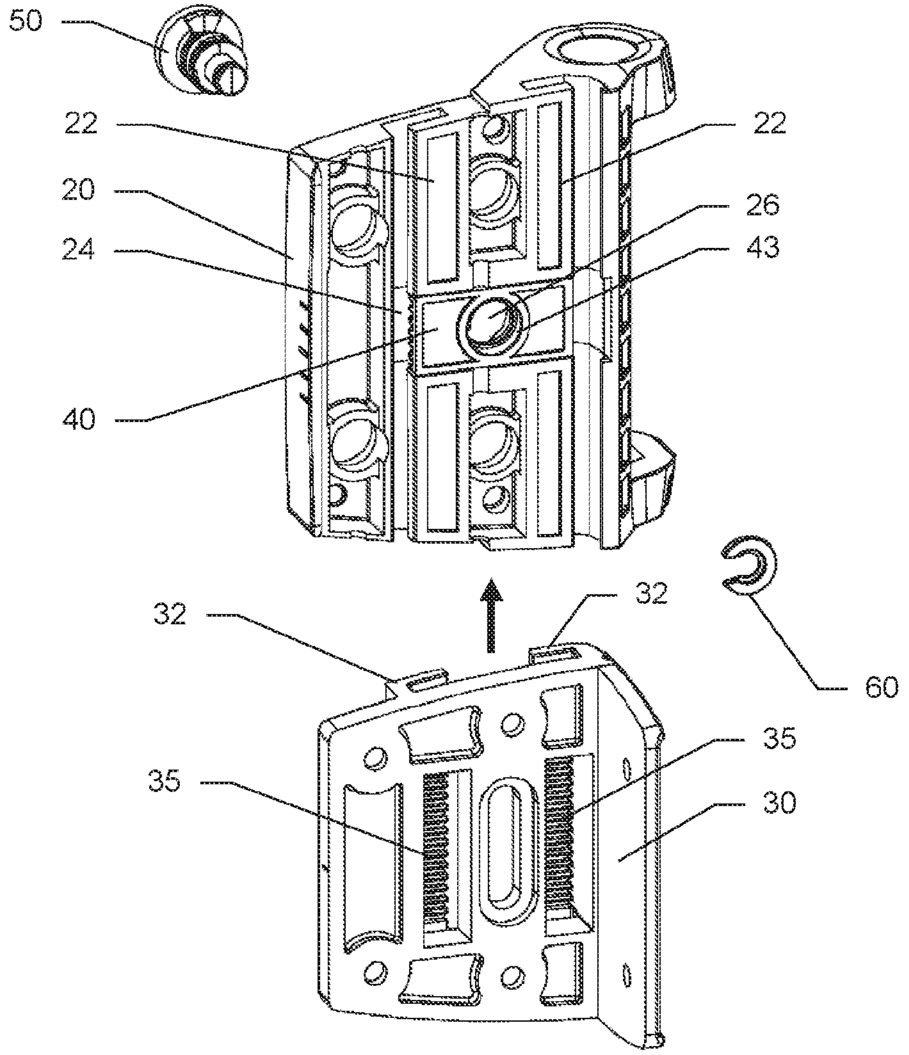
FIG. 14 is an exploded isometric view of the hinge assembly of FIG. 5 illustrating the second stage of assembly.

FIG. 14 is an isometric view of the hinge leaf assembly 10 illustrating the second stage of assembly. As shown in FIG. 14 with the locking element 40 in place, the passage 43 of the locking element 40 is substantially aligned with the passage 26 provided in the hinge leaf 20. As illustrated in FIG. 14, the locking element 40 substantially resides on the same plane as the tracks 22 of the hinge leaf 20 so it does not impede the insertion of the mounting member 30. During the second stage of assembly, the mounting member 30 slides into engagement with the hinge leaf 20 via the guide arrangement, e.g., rails/tracks 32, 22, provided respectively on the mounting member 30 and hinge leaf 20, whereby the rails/tracks 32, 22 are designed to be mutually engageable.

Figure 15:
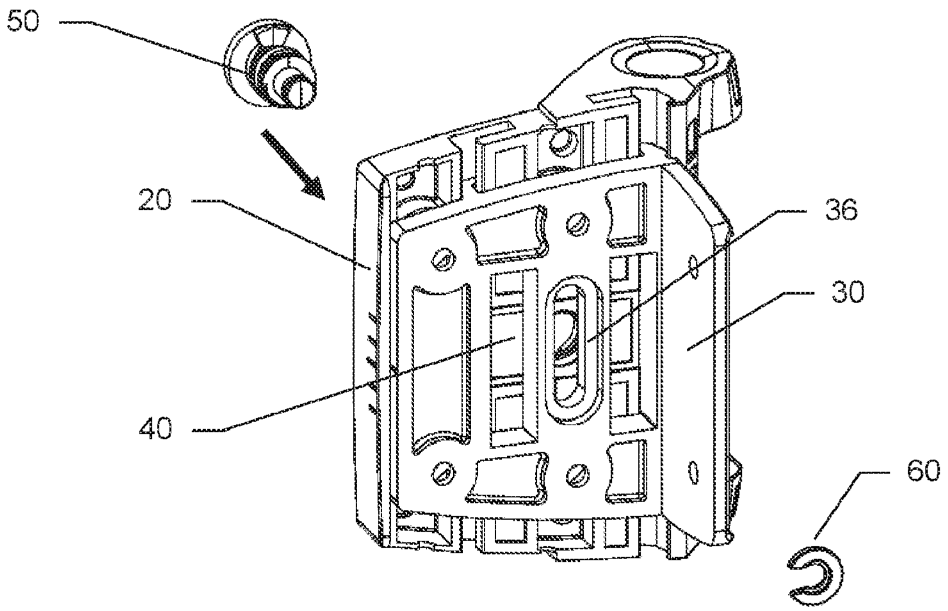
FIG. 15 is an exploded isometric view of the hinge assembly of FIG. 5 illustrating the third stage of assembly.

FIG. 15 is an isometric view of the hinge leaf assembly 10 illustrating the third stage of assembly, whereby the drive member 50 is mounted to the hinge leaf assembly 10. The head 51*a* has larger diameter than the passage 26 of the hinge leaf 20 to allow the drive member 50 to abut the passage 26 and preventing the drive member 50 passing therethrough. Stops 26*a* are provided on the passage 26 of the hinge leaf 20, which may be is also used to guide the rotation drive member 50 and will be described in further detail below.

The shank 51*b* of the drive member 50 protrudes through the passage 26, 43 and the slot 36. As the drive member 50 is mounted to the hinge leaf assembly 10, the thread 47 of the locking element 40 engages with the thread 52 provided on the drive member 50. It can be envisaged the slot 36 controls/limits the movement of the mounting member 30 with respect to the hinge leaf 20. In this embodiment, the slot 36 controls/limits the vertical movement of the mounting member 30 with respect to the hinge leaf 20.

Figure 16:
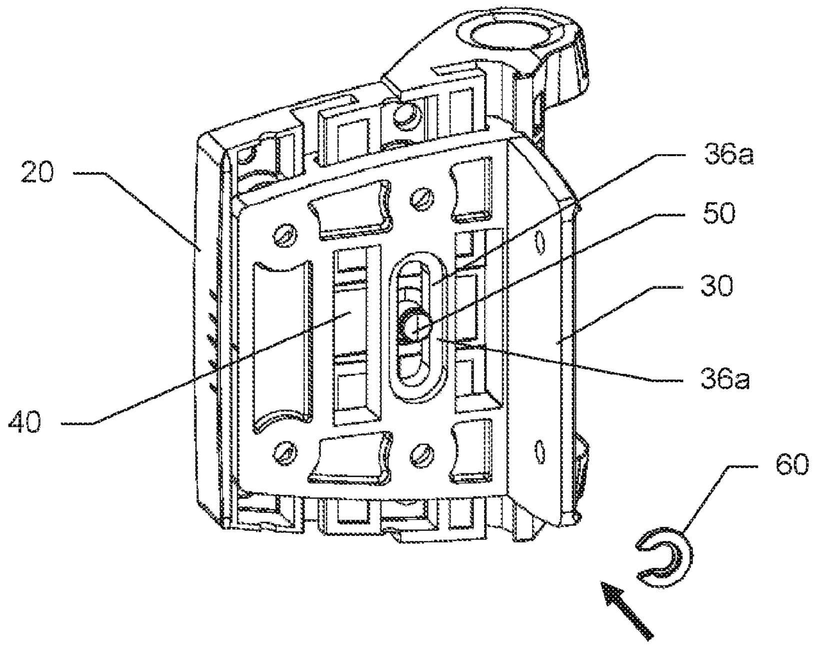
FIG. 16 is an exploded isometric view of the hinge assembly of FIG. 5 illustrating the final stage of assembly.

FIG. 16 is an isometric view of the hinge leaf assembly 10 illustrating the final stage of assembly, whereby the circlip 60 is secured to the annular groove 56 provided on the drive member 50. It can be envisaged the combination of the head 51*a* of the drive member 50 and the circlip 60 abutting the flange 36*a* of the slot 36 prevent the drive member 50 from coming out or being misplaced.

Figure 17A:
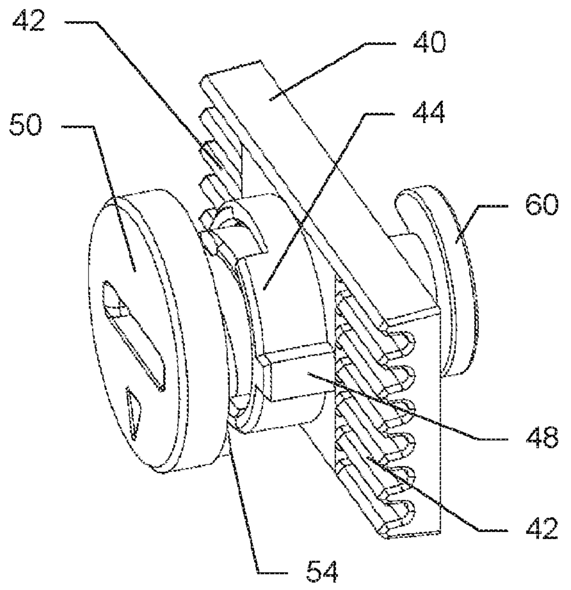
FIG. 17*a* is a detailed perspective view of the drive member with the locking element in a release condition.
Figure 17B:
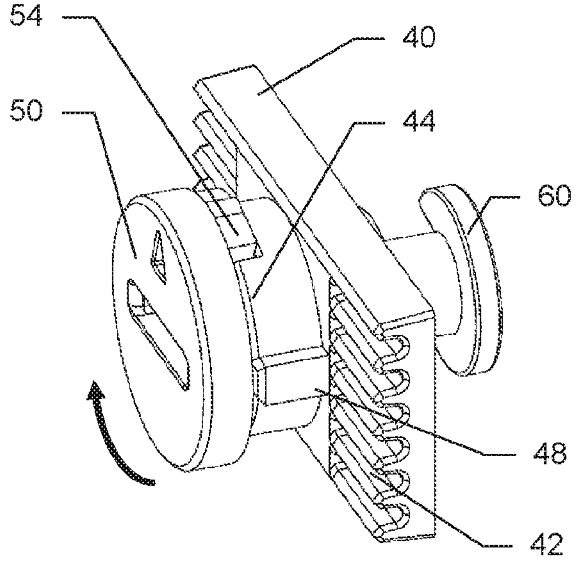
FIG. 17*b* is a detailed perspective view of the drive member and the locking element of FIG. 17*a* in a hold condition.

FIGS. 17*a* to 17*b* are detailed perspective views of the drive member 50 with the locking element 40. For clarity purposes, the hinge leaf 20 and mounting member 30 are omitted from these figures. As shown in FIG. 17*a*, the drive member 50 and the locking element 40 are in a released condition. FIG. 17*b* shows the drive member 50 and the locking element 40 in a hold condition, whereby the drive member 50 is rotated allowing the locking element 40 to be displaced by the rotation of the thread 52 of the driving member 50 with respect to the thread 47 of the locking element 40.

As the locking element 40 moves between the hold and released conditions, the projection 48 provided on the locking element 40 resides in the recess 27 of the hinge leaf 20 to further operate as guiding means.

The drive member 50 and the locking element 40 are in threaded engagement. As the drive member 50 rotates from the released condition to the hold condition, the engaged threads draw the components together and the profiles surfaces into engagement. The locking element 40 is drawn into abutment with the rails of the mounting member and the corresponding teeth are also drawn into engagement. The rotational movement of the drive member 50 actuates liner movement of the locking element 40. The drive member 50 rotates until the stop arrangement prevents any further rotation in one direction in the hold condition. In the hold condition, the components of the hinge assembly are not moveable relative to one another. The stop 54 on the drive member 50 abuts the corresponding stop 44 of the locking element to limit or prevent further rotation of the drive member 50.

Figure 18A:
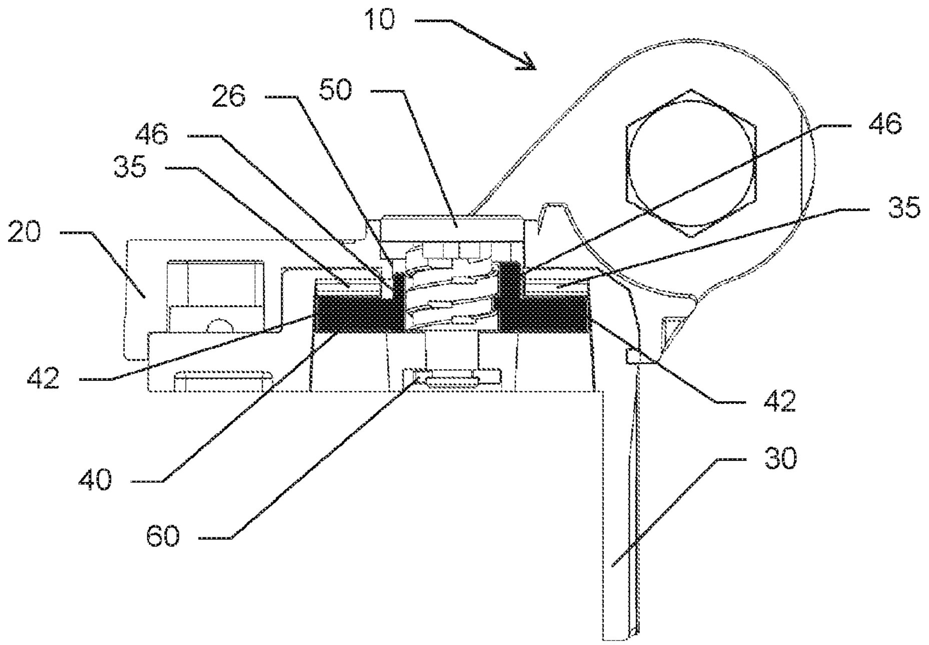
FIG. 18*a* is a partial sectional view of the hinge assembly of FIGS. 4 and 5 with the drive member and locking element in the released condition including a non-sectioned view of the drive member.
Figure 18B:
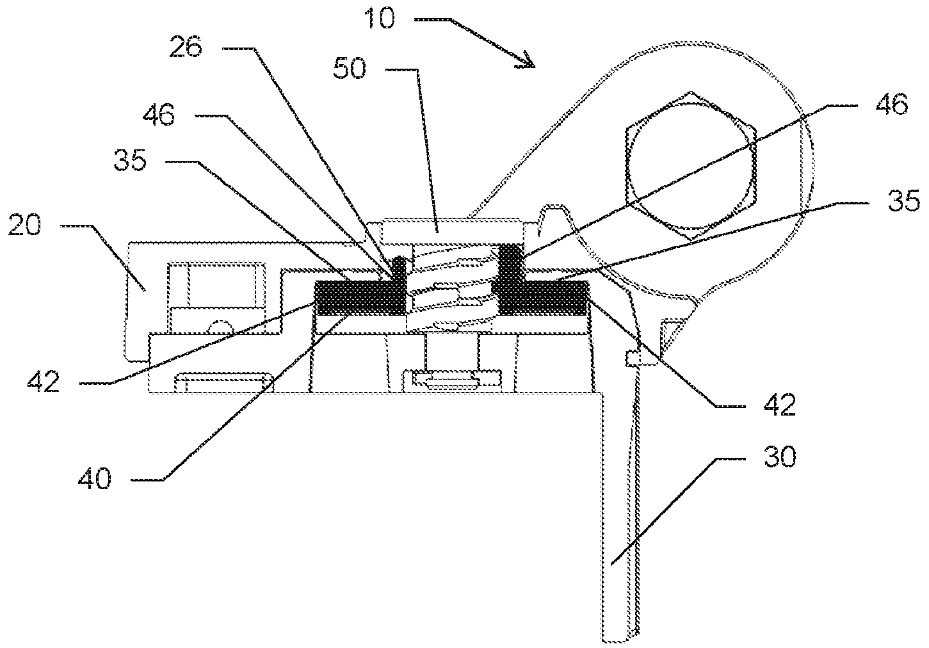
FIG. 18*b* is a sectional view of the hinge leaf assembly of FIGS. 4 and 5 with the drive member and locking element in the hold condition including a non-sectioned view of the drive member.

FIGS. 18*a* and 18*b* are sectional views of the hinge leaf assembly 10 illustrating the operation of drive member 50 and locking element 40 on the hinge leaf assembly 10. For clarity purposes, the drive member 50 is not sectioned. As shown in FIG. 18*a*, the drive member 50 and the locking element 40 are in a released condition, whereby the mounting member 30 can move relative to the hinge leaf 20. As shown in FIG. 18*a* and described above, the set of locking teeth 35 is formed from the plurality of recesses 34 and ribs 34*a*. In the released condition, the guide arrangement 22, 32 retains the leaf 20 and the mounting member 30 relative to one another in alignment but allows movement (e.g. sliding movement) along the direction of the track 32 and rail 22 for repositioning of the leaf 20 and the mounting member 30 relative to one another. The corresponding teeth 35/42 are not in engagement. This allows for realignment of the hinge assembly 100 to optimise the position of the hinge relative to the structure. The drive member 50 does not need to be totally removed from the hinge assembly 100 in the released condition but does need to be loosened. The drive member

50 is rotated in the opposite direction until the leaf 20 is moveable relative to the mounting member 30. It is understood that the drive member 50 may be removed if desired. In this way, the circlip 60 may also need to be removed.

FIG. 18*b* shows the drive member 50 and the locking element 40 in the hold condition, whereby the drive member 50 is rotated and the locking teeth 42 of the locking element 40 engage the locking teeth 35 of the mounting member 30 to limit movement of the hinge leaf 20 with respect to the mounting member 30. There may be a plurality of teeth 42 and teeth 35 that may be engaged in more than one position in the hold condition.

As shown in FIGS. 18*a* and 18*b*, the annular wall 46 extends into the passage 26 of the hinge leaf 20.

Figure 19:
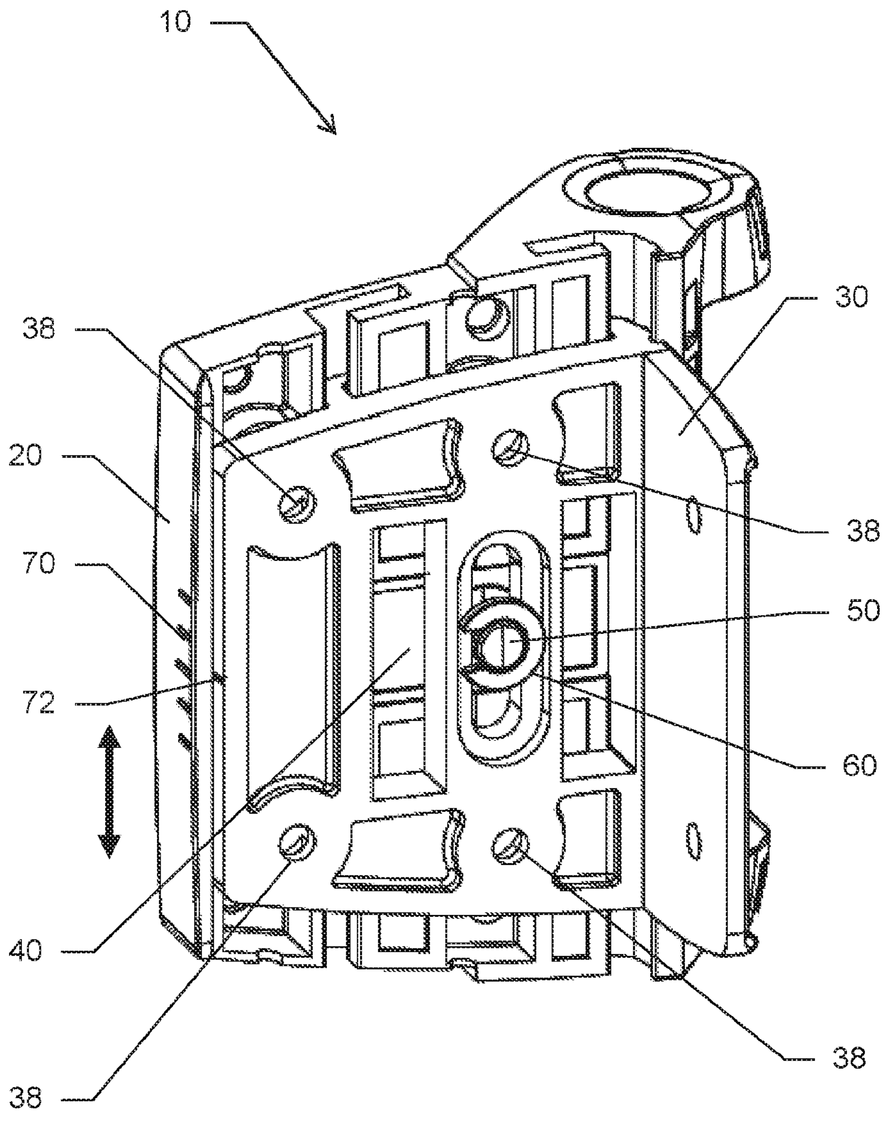
FIG. 19 is a rear perspective view of a hinge assembly of FIG. 5 illustrating adjustment indicators.

FIG. 19 is a rear perspective view of hinge leaf assembly 10, whereby the mounting member 30 is positioned substantially in the central position to the hinge leaf assembly 10, whereby the apertures 28 of the hinge leaf 20 and the screw holes 38*a* of the mounting member 30 are substantially aligned. When these apertures 28 and screw holes 38*a* are aligned, it can be envisaged the hinge leaf assembly 10 can be secured to a structure via the screw holes of the mounting member 30. The mounting member 30 can also be further secured to the structure via screw holes 38*b* provided on the flange 31*b*. As shown, the mounting member 30 are preassembled to the hinge leaf 20 to form the hinge leaf assembly 10. Moreover, this makes the installation process simpler, as it does not require the user to fully remove the mounting member 30 from the hinge leaf assembly 10 during installation.

After the hinge leaf assembly 10 is secured to the structure, the user may wish to adjust the position the hinge leaf 20 without having to fully separate the hinge leaf assembly 10 from the structure. The adjustment may be during installation of the hinge assembly 100 or later. In this case, the user can disengage the locking element 40 from the hinge leaf 20 via the rotating the drive member 50 and adjust the position of the hinge leaf 20 relative to the mounting member 30. Once the hinge leaf assembly 10 is positioned correctly, the user can rotate the drive member 50 so the locking element 40 engages the hinge leaf 20. In the embodiment illustrated in FIGS. 4 to 19 and described above, the user may wish to alter the vertical position of the hinge leaf 20 relative to the mounting member 30 without the need to fully separate the hinge leaf assembly 10 from the structure. Moreover, the user is only required to unlock the drive member 50, as opposed to loosening multiple screws in the prior art hinge assembly and making the adjustment process simpler and efficient. As described above, the circlip 60 is provided to prevent drive member 50 from coming out or misplaced during the adjustment process.

As shown in FIG. 19, alignment markers 70, 72 on the hinge leaf 20 and the mounting member 30 respectively are provided to provide an indication of vertical adjustment range.

Figure 20:
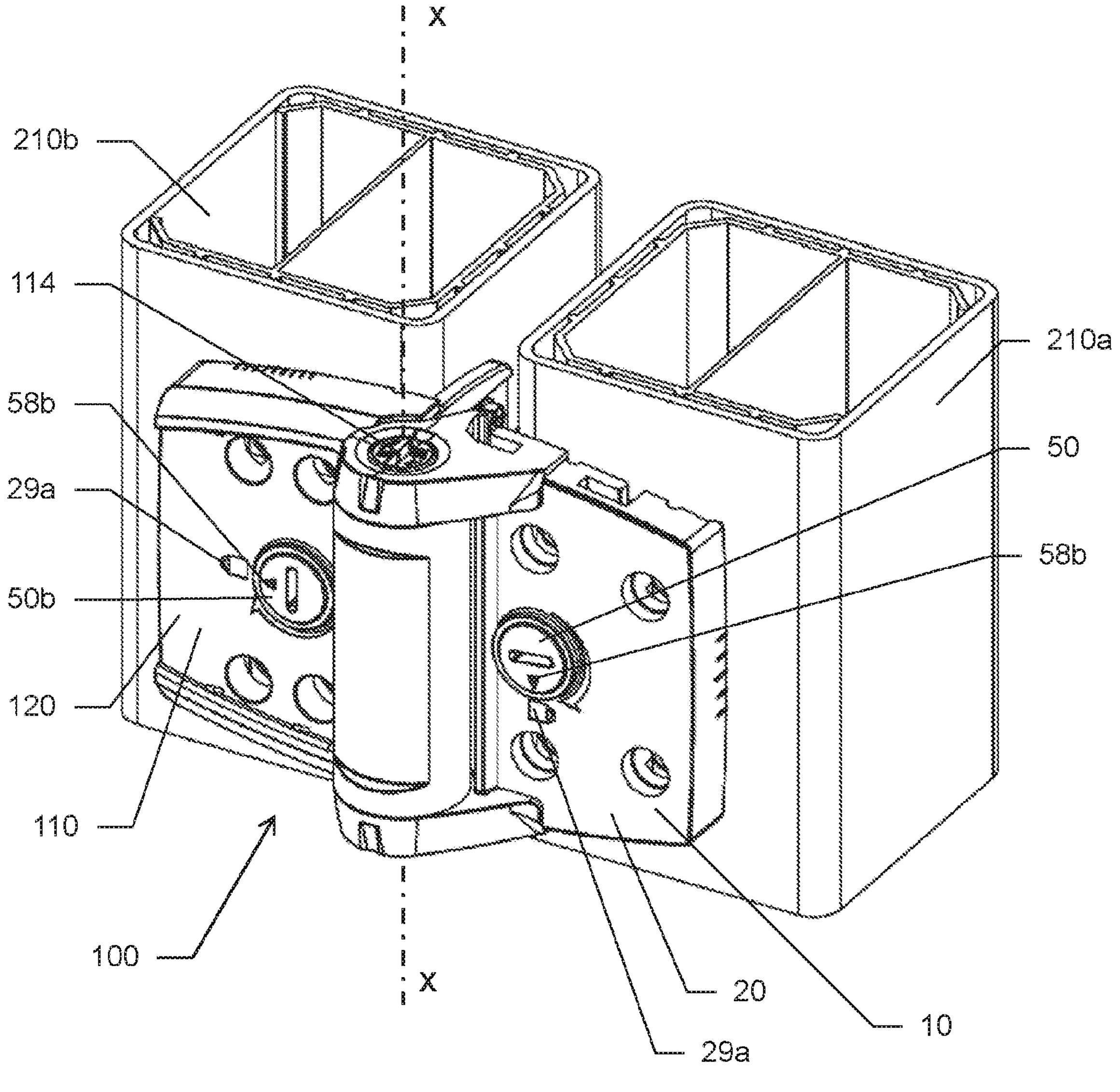
FIG. 20 is perspective view of a hinge assembly comprising two hinge leaves mounted to a structure.

FIG. 20 shows another embodiment of disclosure, whereby a hinge assembly 100 comprises two hinge leaf assemblies 10, 110 mounted to a movable barrier or structure 210*a*, 210*b* respectively. As shown in FIG. 20, line X-X indicates the pivotal axis of the hinge assembly 100. In the embodiment as shown, one leaf assembly may be mounted or to a fixed post, e.g. a fence post and other leaf assembly may be mounted or fixed to a gate. The hinge leaf assembly 110 comprises similar locking arrangement as the hinge leaf assembly 10, with the exception the guide arrangement (not shown) of hinge leaf assembly 110 resides on a plane that is substantially perpendicular to the tracks/rails 22, 32 of the hinge leaf assembly 10. It can be envisaged with this embodiment, the locking arrangements of the hinge assembly 100 allows the user to make both vertical and horizontal adjustments to the hinge assembly 100 without the need of having to fully separate the hinge assembly 100 from the structures 210*a* and 210*b*.

In addition, it can be envisaged the hinge assembly 100 improves the security or tamper resistance over the prior art hinge assembly A, as the combination of the screw holes 38*b* provided on the flange 31*a* and the circlip 60 prevents the hinge leaf 20 from being disassembled from the hinge leaf assembly 10, 110. Access to the screw holes 38*b* provided on the flange 31*a* can be provide once the gate is opened.

Advantageously, the circlip 60 can also prevent drive member 50 from coming out when the gate is subjected to vibration during operation, therefore, preventing the hinge leaf 20 from separating from the mounting member 20 and improving safety. Moreover, when the locking element 40 is in the released condition, the mutually engageable tracks/rails 22, 32 prevent the leaf 20 from fully separating from the mounting member 20, for example, preventing the hinge leaf 20 from fully separating from the mounting member 20 in the direction parallel to the mounting member 20 being mounted to the moveable barrier or structure 210*a*, 210*b*. Unlike the prior art hinge assembly A, when the nuts D become loosen, the hinge C can fully separate from the mounting member B.

As shown in FIG. 20, each hinge leaf assembly 10, 110 is provided with indicators 29*a* to show the position of the drive member 50, 50*b*. As shown in this embodiment the indicators 29*a* displays a closed padlock symbol that symbolises the locking element 40 is engaged with the leaf 20, so the leaf 20 is fixed to the structures 210*a*, 201*b* via the mounting members 30. In another embodiment, an open padlock symbol may be used to symbolise the locking element is disengaged from the leaf.

As shown in FIG. 20, the hinge assembly 100 is provided with coupling portions 114 as part of a self-closing mechanism, as described in US Patent Publication No. 2014/0075720A1 (Caffin et al.). The coupling portions 114 have a driving interface similar to the driving interface 58*a* of the drive member 50, so that a common tool can be used to adjust/drive the coupling portions 114 and the drive member 50, so there is one less tool for the user to use when install the hinge assembly 100. The prior art hinge A requires two separate tools to make the tension adjustment and to tighten the nuts D.

Furthermore, there are prior art hinges that utilises a rack and pinion mechanism to achieve vertical and horizontal adjustments, however, access to such mechanism can only be achieved from the side. Therefore, such prior art hinges are not suited for post-to-wall applications where the wall would restrict access to the adjustment mechanism.

As shown in FIG. 20, the user can make vertical and horizontal adjustments from the front face of the hinge assembly 100, so the hinge assembly 100 can be suited on post-to-wall applications.

In another embodiment, it can be envisaged the hinge assembly (not shown) may only be provided with horizontal adjustment.

Figure 21:
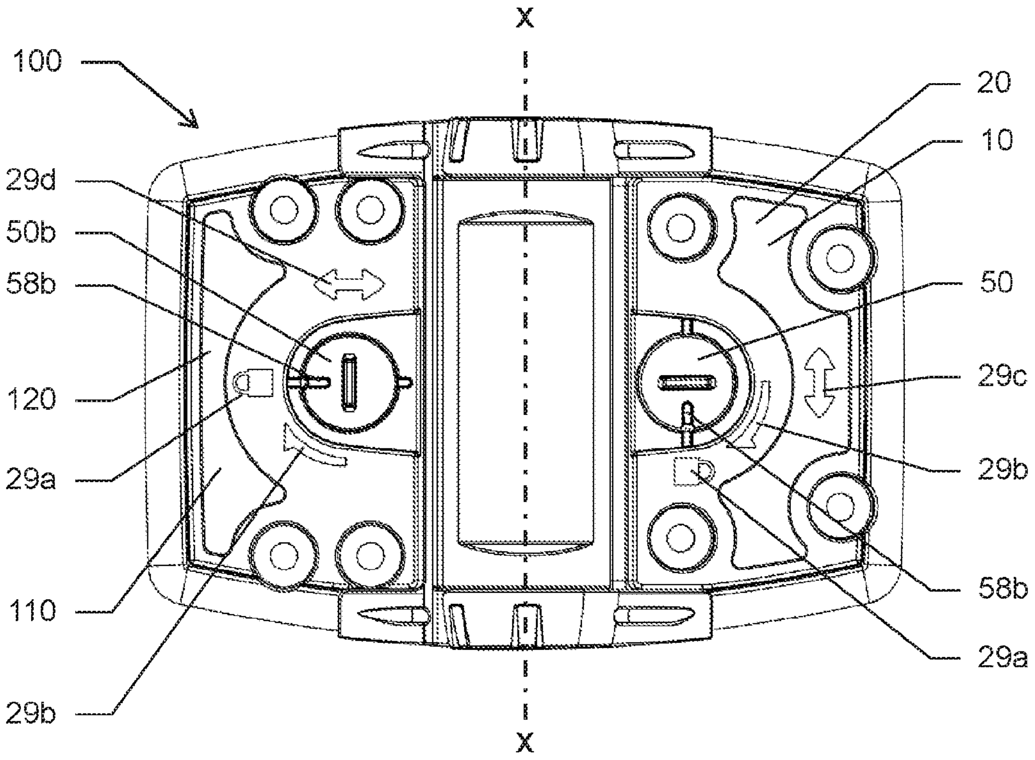
FIG. 21 is a front view of an embodiment of the hinge assembly illustrating adjustment indicators.

FIG. 21 show a further embodiment of the present invention. As shown, the first hinge leaf assembly 10 further includes a directional indicator 29*c* indicative of the direction of adjustment, and in this case vertical adjustment. The second hinge leaf assembly 110 further includes a directional indicator 29*d* indicative of the direction of adjustment, and in this case horizontal adjustment. Advantageously, the directional indicators 29*c*, 29*d* provide the user with visibility of which drive member 50, 50*b* needs to be unlocked to make suitable adjustment, for example, to make horizontal adjustment only drive member 50*b* is required to be unlocked and to make vertical adjustment only drive member 50 is required to be unlocked.

As shown in FIGS. 20 and 21 and as described above with reference to FIG. 18*b*, when the indicators 58*b* of the drive members 50, 50*b* are aligned with their respective hold condition indicators 29*a*, this indicates the locking teeth 42 of the locking element 40 are engaged with the locking teeth 35 of the mounting member 30 to limit movement or adjustment of each hinge leaf 20, 120 with respect to their mounting member 30, 130.

As described above with reference to FIG. 18*a*, when the drive members 50, 50*b* are rotated such that the indicators 58*b* of the drive members 50, 50*b* are no longer aligned with their respective hold condition indicators 29*a*, the drive members 50, 50*b* and their locking elements 40 are in the released condition. In such case, the locking teeth 42 of the locking element 40 are disengaged from the locking teeth 35 of the mounting member 30 to allow movement or adjustment of each hinge leaf 20, 120 with respect to their mounting member 30, 130.

Figure 22:
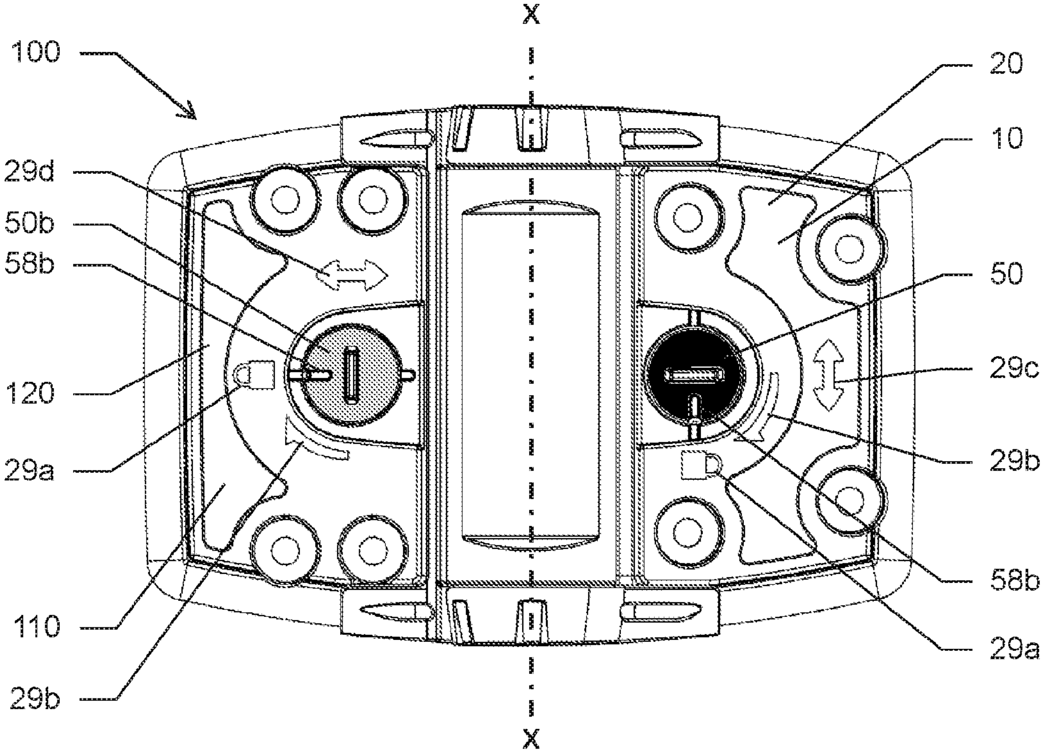
FIG. 22 is a front view of a further embodiment of the hinge assembly illustrating adjustment indicators.

FIG. 22 shows a further embodiment of the present invention, whereby the drive members 50, 50*b* may be colour coded to differentiate one drive member from the other. The advantage of colour coding each drive member 50, 50*b* is when a pair of hinge assemblies 100 are being mounted to the movable barrier or structure 210*a*, 210*b* as shown in FIG. 23, the user can visualise the correct orientation of each hinge assemblies 100 during installation.

Figure 23:
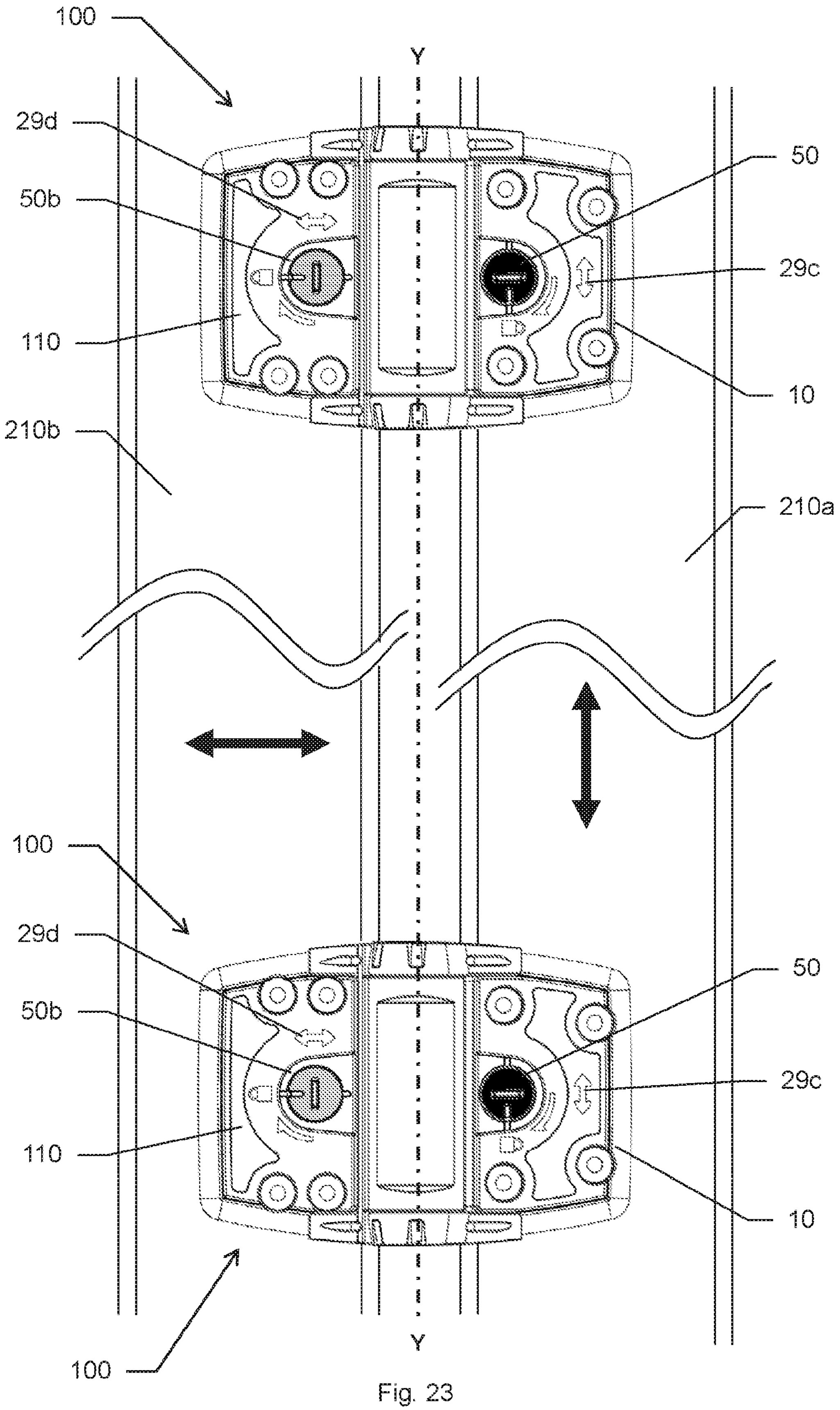
FIG. 23 is a front view of two hinge assemblies of FIG. 22 mounted to a structure.

As shown in FIG. 23, the drive members 50*b* of both hinge assemblies 100 are located on the structure 210*a* and the other drive members 50 are located on the movable barrier 210*b*. This allows horizontal adjustment to be made on the movable barrier 210*b* and vertical adjustment to be made on the structure 210*a*, such that the pivotal axis X-X of both hinge assemblies 100 are maintained and the movable barrier 210*b* may be operable with minimal or no interference.

The colour coded drive members 50, 50*b* may provide a visual indicator for the user to avoid reverse orientating one hinge assembly 100 with the other.

Figure 24:
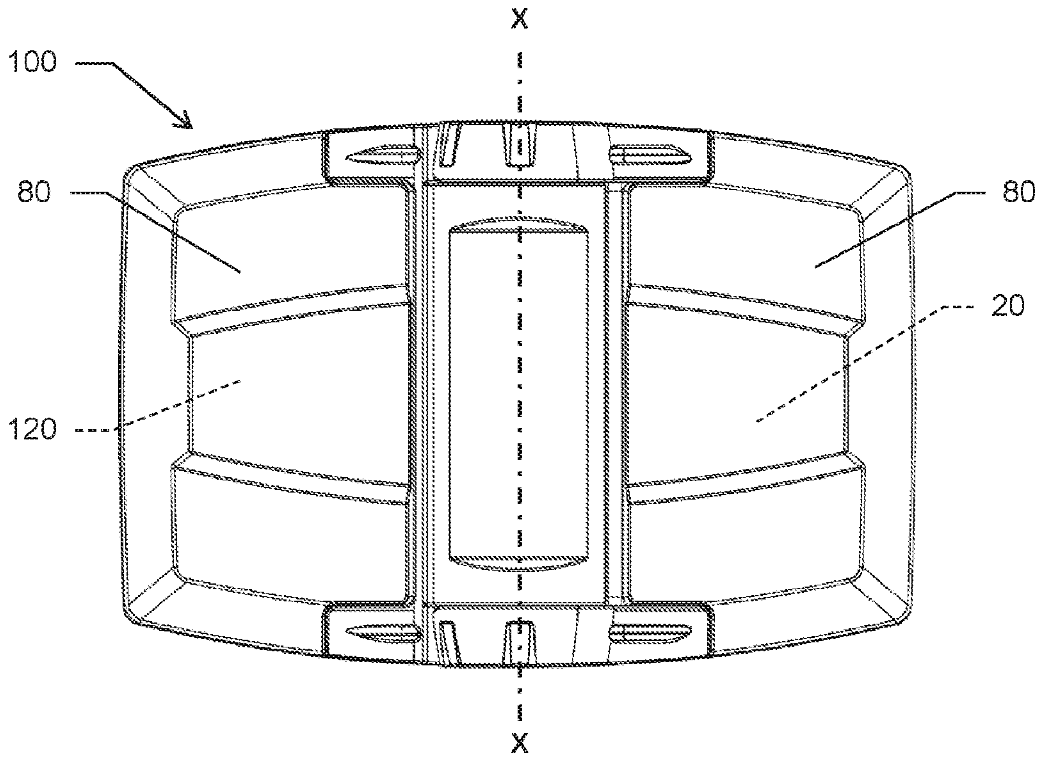
FIG. 24 is a front view of a further embodiment of the hinge assembly with covers.

In another embodiment as shown in FIG. 24, aesthetic covers 80 may be provided to cover the screw holes 28 and the drive members 50, 50*b*. The aesthetic covers 80 may prevent tampering of the drive members 50, 50*b* after installation. Advantageously, the aesthetic covers 80 may be snapped fitted to each hinge leaves 20, 120.

Applications

Although the embodiments disclose vertical or horizontal adjustments for hinges, it can be appreciated from the above disclosure that the invention may be applied to any one or more linear or non-linear adjustments along any plane, angular plane or direction.

Although the embodiments disclose linear or non-linear adjustments for hinges, it can be appreciated from the above disclosure that the invention may be applied to any products, assemblies or the like that is required to be mounted or secured to a structure, fixture, substrate or the like.

Although the embodiments disclose teeth 35, 42 used to limit movement between hinge leaf 20 and the mounting member 30, it can be envisaged friction surfaces or materials may be used.

Although the embodiments disclose the hinge assembly being used on gates, it can be envisaged that the hinge assembly can be used on other applications such as security fencing, zone restriction fencing, doors, safety barriers, security barriers, care homes, garden gates, swimming pool and child care applications etc.

In the claims which follow and in the preceding disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the present disclosure.

Accordingly, the present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope being indicated by the following claims.

Embodiments

Embodiment 1: According to one embodiment, there is provided a hinge leaf assembly mountable to a movable barrier or structure comprising a leaf and a mounting member, wherein the leaf and the mounting member are connected by a guide arrangement to allow the hinge leaf to move relative to the mounting member, whereby a locking element is provided in either the hinge leaf or the mounting member that is operable to adapt a hold condition and a released condition, and when the locking element is in the hold condition relative movement between the hinge leaf and a mounting member is prevented, and when the locking element is in the released condition the hinge leaf is able to move relative to the mounting member.

Embodiment 2: A hinge leaf assembly according to embodiment 1, wherein the locking element comprises a profiled surface, and when the locking element is in the hold condition the profiled surface is brought into engagement with a complimentary profiled surface provided on either the leaf or mounting member and prevents movement between the leaf and the mounting member, and when the locking element is in the released condition the profiled surface is disengaged from the complimentary profiled surface provided on either the hinge leaf or mounting member to allow the leaf to move relative to the mounting member.

Embodiment 3: A hinge assembly according to embodiment 1 or 2, wherein the locking element includes projection an annular wall, and when assembled, the annular wall extends into a passage formed in the hinge leaf or mounting member to allow the locking element to be correctly orientated with any one of the leaf or mounting member.

Embodiment 4: A hinge leaf assembly according to embodiment 3, wherein the projection resides in a recess of the leaf.

Embodiment 5: A hinge leaf assembly according to any one of the previous embodiments, wherein the movement of the locking element between the hold and released conditions is perpendicular or transverse to a pivotal axis of the hinge leaf assembly.

Embodiment 6: A hinge leaf assembly according to any one of the previous embodiments, wherein the locking element resides in a space provided in the hinge leaf, whereby the space guides the locking element between the hold and released conditions.

Embodiment 7: A hinge leaf assembly according to embodiment 6 when made dependent to embodiment 2, wherein the complimentary profiled surface is provided on the mounting member.

Embodiment 8: A hinge leaf assembly according to embodiment 7, wherein the profiled surface comprises a plurality of recesses and/or ribs provided on the guiding means of the mounting member.

Embodiment 9: A hinge leaf assembly according to any one of the previous embodiments, wherein a drive member is used to move the locking element between the hold and released conditions.

Embodiment 10: A hinge leaf assembly according to embodiment 9, wherein the drive member includes a head and shank, and an external threading is formed on the shank, wherein the external threading engages a complimentary thread provided on the locking element for translating rotational movement into linear movement for the locking element.

Embodiment 11: A hinge leaf assembly according to embodiment 11, wherein the head abuts a passage provided on the leaf and distal end of the shank is provided with an annular groove for receiving a circlip to be guided by a slot provided in the mounting member, wherein the combination of the head) and the circlip prevents the drive member from coming out or being misplaced.

Embodiment 12: A hinge leaf assembly according to embodiment 11, wherein the shank passes through a passage provided in the locking element, and said complimentary thread is provided on inner surface of the passage for engaging with the threading of the shank.

Embodiment 13: A hinge leaf assembly according to any one of embodiments 9 to 12, wherein the drive member is provided with a stop arrangement to limit or control the rotation of the drive member.

Embodiment 14: A hinge leaf assembly according to any one of embodiments 9 to 13, wherein indicators are provided on the hinge leaf and the drive member, whereby alignment of the indicators is indicative of the hold condition and release condition between the locking element and the hinge leaf or the mounting member.

Embodiment 15: A hinge leaf assembly according to any one of embodiments 9 to 15, wherein an indicator is provided on the hinge leaf indicative of the direction of rotation of the drive member.

Embodiment 16: A hinge leaf assembly according to any one of the previous embodiments, wherein the when the locking element is in the released condition, the leaf moves with respect to the mounting member in one or more of the following directions:

i. parallel to a pivotal axis of the hinge leaf assembly; and ii. perpendicular or transverse to the pivotal axis of the hinge leaf assembly.

Embodiment 17: A hinge leaf assembly according to any one of the previous embodiments, wherein positional indicators are provided on both the leaf and mounting member, indicative of the position of the leaf with respect to the mounting member.

Embodiment 18: A hinge assembly comprising two or more hinge leaf assemblies of any one of embodiments 1 to 17.

Embodiment 19: A hinge assembly according to embodiment 18, wherein a first hinge leaf assembly being connectable to the second hinge leaf assembly and when so connected the first hinge leaf assembly being rotatable relative to the second hinge leaf assembly about an axis.

Embodiment 20: A hinge assembly according to embodiment 19, wherein when the locking element of the first hinge leaf assembly is in the released condition the leaf moves with respect to the mounting member in a direction parallel to a pivotal axis of the hinge assembly, and when the locking element of the second hinge leaf assembly is in the released condition the leaf moves with respect to the mounting member in a direction perpendicular or transverse to the pivotal axis of the hinge assembly.

What is claimed is:

1. A hinge assembly comprising:

a first hinge leaf assembly and a second hinge leaf assembly, each having their respective hinge leaf, wherein the first hinge leaf assembly being connectable to the second hinge leaf assembly and when so connected the first hinge leaf assembly being rotatable relative to the second hinge leaf assembly about an axis;

at least one mounting member fixable to a moveable barrier or a structure through a fixing arrangement, the first and/or second hinge leaf being connectable to the at least one mounting member so as to be slidably adjustable relative thereto along a plane in at least one direction, said plane being defined by an interface between (i) the at least one mounting member and the first hinge leaf or (ii) the at least one mounting member and the second hinge leaf; and a locking arrangement to releasably lock the first and/or second hinge leaf to the at least one mounting member, the locking arrangement being operative to adopt a hold condition where relative movement between the first and/or second hinge leaf and the at least one mounting member is prevented, and a released condition where the first and/or second hinge leaf is able to be slidably adjusted relative to the at least one mounting member, the locking arrangement comprises a locking element disposed between the first and/or second hinge leaf and the at least one mounting member, and movable relative to both the first and/or second hinge leaf and the at least one mounting member to cause the locking arrangement to adopt the hold condition or the released condition.

2. A hinge assembly according to claim 1, wherein the locking arrangement further comprises a drive member operative to move the locking element to cause the locking arrangement to adopt the hold condition or the released condition.

3. A hinge assembly according to claim 2, wherein the at least one mounting member and the first and/or second hinge leaf are interconnected via a guide arrangement, wherein the guide arrangement includes one or more rails provided on at least one mounting member or the first and/or second hinge leaf, and one or more complementary tracks provided in the other of the at least one mounting member or the first and/or second hinge leaf, when in the released condition the guide arrangement prevents the hinge leaf from fully separating from the mounting member in the direction parallel to the mounting member being mounted to the moveable barrier or structure.

4. A hinge assembly according to claim 3, wherein the guide arrangement aligns the at least one mounting member and the first and/or second hinge leaf relative to one another, and when so aligned, the drive member is operative to draw the at least one mounting member, the first and/or second hinge leaf and the locking element together into the hold condition, and the components are maintained relative to one another to allow guided sliding movement of the at least one mounting member relative to the first and/or second hinge leaf in the release condition in the direction of the guide arrangement.

5. A hinge assembly according to claim 3, wherein the one or more rails include a profiled surface configured to interengage with a corresponding profiled surface formed on the locking element.

6. A hinge assembly according to claim 5, wherein the profiled surface of the one or more rails and the corresponding profiled surface of the locking element include a plurality of teeth configured to interengage with one another.

7. A hinge assembly according to claim 3, wherein the first and/or second hinge leaf assembly define a space in which the locking element is disposed.

8. A hinge assembly according to claim 7, wherein the space is defined between the rails or tracks, such that when the at least one mounting member and the first and/or second hinge leaf are assembled the locking element is disposed between the at least one mounting member, the respective leaf and the guide arrangement.

9. A hinge assembly according to claim 8, wherein the locking element includes an annular wall, and when assembled, the annular wall extends into a passage formed in the first and/or second hinge leaf.

10. A hinge assembly according to claim 9, wherein the drive member is rotatable to move the locking arrangement between the hold and the release conditions, the drive member being threadingly engaged with the locking element.

11. A hinge assembly according to claim 10, wherein the drive member includes a head and shank, and an external threading is formed on the shank.

12. A hinge assembly according to claim 11, wherein the locking arrangement further comprises a stop arrangement which defines the hold condition, wherein the drive member is prevented from any further rotation in one direction relative to the locking element, the at least one mounting member and the first and/or second hinge leaf.

13. A hinge assembly according to claim 12, wherein the stop arrangement includes an abutment surface formed on one or both of the locking element and the first and/or second hinge leaf and a corresponding abutment surface formed on the drive member, such that when the abutment surfaces are in abutment the locking arrangement is in the hold condition.

14. A hinge assembly according to claim 11, wherein the at least one mounting member includes a slot extending in a same direction as the guide arrangement, and the slot is configured to receive the shank of the drive member.

15. A hinge assembly according to claim 9, wherein the hinge assembly further comprises an anti-rotational arrangement which prevents rotation of the locking element relative to the first and/or second hinge leaf assembly.

16. A hinge assembly according to claim 15, wherein the anti-rotational arrangement includes a projection formed on one of the annular wall of the locking element or the passage of the first and/or second leaf and a corresponding recess formed on the other of the annular wall of the locking element or the passage of the first and/or second leaf.

17. A hinge assembly according to claim 1, wherein the locking arrangement is able to adopt the hold condition when the first and/or second hinge leaf assembly and the at least one mounting member are in more than one position to allow, when the locking arrangement is in the release condition, repositioning of the first and/or second hinge leaf assembly relative to the at least one mounting member to a selected position whereat the locking arrangement is moved to the hold condition.

18. A hinge leaf assembly mountable to a movable barrier or structure comprising:

a hinge leaf and a mounting member, wherein the hinge leaf and the mounting member are connected by a guide arrangement to allow the hinge leaf to slide relative to the mounting member in a plane, whereby a locking element is provided in either the hinge leaf or the mounting member that is operable to adapt a hold condition and a released condition, and when the locking element is in the hold condition relative sliding movement between the hinge leaf and the mounting member is prevented, and when the locking element is in the released condition the hinge leaf is able to slide relative to the mounting member, wherein the guide arrangement includes one or more rails provided on either the mounting member or the hinge leaf, and one or more complementary tracks provided in the other of the mounting member or the first hinge leaf, and when in the released condition the guide arrangement prevents the hinge leaf from fully separating from the mounting member in a direction perpendicular to said plane of sliding.

19. A hinge leaf assembly according to claim 18, further comprising a drive member operative to move the locking element to cause the locking arrangement to adopt the hold condition or the released condition.

20. A hinge assembly comprising two hinge leaf assemblies of claim 18, wherein a first hinge leaf assembly being connectable to a second hinge leaf assembly and when so connected the first hinge leaf assembly being rotatable relative to the second hinge leaf assembly about an axis.

21. A hinge assembly according to claim 20, wherein when the first hinge leaf assembly is in the released condition the first leaf is movable relative to the mounting member in a horizontal direction, and wherein when the second hinge leaf assembly is in the released condition the second leaf is movable relative to the mounting member in a vertical direction.

* * * * *